(12) United States Patent
Mead et al.

(10) Patent No.: US 6,680,942 B2
(45) Date of Patent: Jan. 20, 2004

(54) DIRECTORY SERVICES CACHING FOR NETWORK PEER TO PEER SERVICE LOCATOR

(75) Inventors: Andrew Mead, Durham, NC (US); Arunkumar Thippeswamy, Cupertino, CA (US); John Lautmann, Freemont, CA (US); Mark Denny, San Jose, CA (US); Scott Bales, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/347,512

(22) Filed: Jul. 2, 1999

(65) Prior Publication Data

US 2003/0067912 A1 Apr. 10, 2003

(51) Int. Cl.[7] .............................................. H04L 12/56

(52) U.S. Cl. ...................................................... 370/392

(58) Field of Search .............................. 707/3; 370/392, 370/396, 395.31, 398, 395.5, 395.72, 400, 422, 475

(56) References Cited

U.S. PATENT DOCUMENTS

| | | | | |
|---|---|---|---|---|
| 5,511,208 A | * | 4/1996 | Boyles et al. ................ | 709/223 |
| 5,987,521 A | * | 11/1999 | Arrowood et al. ........... | 709/239 |
| 6,032,175 A | * | 2/2000 | Fletcher et al. .............. | 709/200 |
| 6,131,117 A | * | 10/2000 | Clark et al. .................. | 709/223 |
| 6,131,120 A | * | 10/2000 | Reid ............................. | 709/225 |
| 6,154,743 A | * | 11/2000 | Leung et al. ................. | 707/10 |
| 6,185,618 B1 | * | 2/2001 | Brabson ...................... | 709/228 |
| 6,192,362 B1 | * | 2/2001 | Schneck et al. ............. | 707/10 |
| 6,246,669 B1 | * | 6/2001 | Chevalier et al. ............ | 370/238 |
| 6,321,259 B1 | * | 11/2001 | Ouellette et al. ............ | 709/220 |
| 6,335,919 B1 | * | 1/2002 | Maegawa .................... | 370/254 |

OTHER PUBLICATIONS

Doeringer, W.A. et al "A Survey of Light–Weight Transport Protocols for High–Speed Networks" Communications, vol. 38, Issue 11, Nov. 1990, pp. 2025–2039.*

Maass, H. "Open Mobility Management Platform with Directory–Based Architecture and Signaling Protocols" Open Architecture and Network Programming, Apr. 3–4, 1998, pp. 72–87.*

(List continued on next page.)

*Primary Examiner*—Chi Pham
*Assistant Examiner*—Anh-Vu H Ly
(74) *Attorney, Agent, or Firm*—Cesari and McKenna, LLP

(57) ABSTRACT

A new directory service is established for a peer router receiving a data packet from an end station on a local area network connected to a port of the peer router, the peer router hereinafter being referred to as the source router. The data packet is addressed to a destination address. The source router determines that the data packet is to be encapsulated as an encapsulated packet, and the encapsulated packet routed by a peer-to-peer protocol to a destination router. The destination router then transmits the packet onto a local area network to the destination address. The source router locates the proper peer destination router by use of a database. The database is maintained on a server, where the database has entries for destination address, and an entry for a particular destination address gives the address of a peer router capable of routing a packet to that particular destination address. The database is populated by peer routers updating the database with information concerning the destination address which the peer routers can reach. The database on the server is interrogated by the source router to learn the address of a destination peer router, and an encapsulated packet is then transmitted onto a connectionless network for transmission to the destination router. The peer-to-peer routing protocol may be DLSw protocol. The database may be maintained in accordance with the X.500 directory standard. The database may be interrogated using the lightweight data access protocol (LDAP).

40 Claims, 13 Drawing Sheets

OTHER PUBLICATIONS

Park, A.S. et al "Service Trading for Mobile Agents with LDAP as Service Directory" Enabling Technologies, Jun. 17–19, 1998, pp. 270–275.*

Jadoul, M. et al "Access to an X.500 Directory Service via ADSI screen phones" Global Telecommunications Conference, vol. Nov. 3–8, 1997, pp. 1740–1744.*

Droms, R.E. "Access to Heterogeneous Directory Services" INFOCOM '90, vol. 3, Jun. 3–7, 1990, pp. 1054–1061.*

Alexander, C. A. et al "Integrating the Portable APPN Protocol Stack into a Multiprotocol Router" Southeastcon '95, 26–29 Marc 1995, pp. 133–141.*

Tanenbaum, Andrew, *Computer Networks*, Second Edition, Prentice Hall–1988, pp. 46–47.

Nilausen, Jesper, *APPN Networks*, John Wiley & Sons, 1994, pp. 43–50.

*RFC 1795*, Internet Engineering Task Force, Apr., 1995.

Perlman, Radia, *Interconnections, Second Edition*, Addison Wesley Longman, Inc., 1999, Chapter 7, pp. 165–191, 28–33, 99–104.

Comer, Douglas E., *Internetworking with TCP/IP, Third Edition Vol 1*, Prentice Hall, 1995 1, pp. 91–97.

Stallings, William, *High Speed Netowrks, TCP/IP and ATM Design Principles*, Prentice Hall, 1998, pp. 27–28. And pp. 301–317.

Black, Ulyess, *TCP/IP and Related Protocols*,McGraw Hill, 1998, pp. 144–151.

*RFC 1777, Request For Comments*, Internet Engineering Task Force, Mar. 1995,.

Howes, Timothy, et al, *LDAP Programming Directory Enabled Applications with Lightweight Directory Access Protocol*,Macmillan Technical Publishing Co., 1997, pp. 21–34.

* cited by examiner

|   | A<br>302 | B<br>112B | C<br>306 | D<br>308 310 |
|---|---|---|---|---|
| 1 | DESTINATION ADDRESS, MAC ADDRESS OF DESTINATION END STATION, NETBIOS NAME, etc. | IP ADDRESS (LAYER 3 ADDRESS) OF REACHABILITY ROUTER | DATE AND TIME THAT ENTRY WAS CREATED | OTHER FIELDS OR DATA |
| 2 | MAC ADDRESS 1 | ROUTER 1 | | |
| 3 | | ROUTER 2 | | |
| 4 | | ROUTER 3 | | |
| 5 | | etc. | | |
| 6 | MAC ADDRESS 2 | ROUTER 1 | | |
| 7 | | ROUTER 2 | | |
| 8 | | ROUTER 3 | | |
| 9 | | etc. | | |
| 10 | MAC ADDRESS 3 | ROUTER 1 | | |
| 11 | | ROUTER 2 | | |
| 12 | | ROUTER 3 | | |
| 13 | | etc. | | |
| 14 | MAC ADDRESS 4 | ROUTER 1 | | |
| 15 | | ... | | |
| 16 | | etc. | | |
| 17 | | . | | |
| 18 | | . | | |
| 19 | | . | | |
| 20 | | | | |
| 21 | MAC ADDRESS N | ROUTER 1 | | |
| 22 | | ROUTER 2 | | |
| 23 | | ROUTER 3 | | |
| 24 | | ... | | |
| 25 | | etc. | | |
| 26 | | | | |
| 27 | NETBIOS NAME 1 | ROUTER 1 | | |
| 28 | | ROUTER 2 | | |
| 29 | | etc. | | |
| 30 | NETBIOS NAME 2 | ROUTER 1 | | |
| 31 | | etc. | | |
| 32 | | | | |
| 33 | NETBIOS NAME 3 | ROUTER 1 | | |
| 34 | | etc. | | |
| 35 | | | | |
| 36 | NETBIOS NAME 4 | ROUTER 1 | | |
| 37 | | etc. | | |
| 38 | NETBIOS NAME N | ROUTER 1 | | |
| 39 | | ... | | |
| 40 | | etc. | | |

REACHABILITY TABLE IN REACHABILITY SERVER

FIG. 4

TCP/IP PACKET TRANSMITTED INTO NETWORK CLOUD

LAYER 3 DATA, SSP FRAME

IP LAYER 3 HEADER

650

| EVEN BITE | ODD BITE |
|---|---|
| (00) VERSION NUMBER | (01) HEADER LENGTH (= 16) |
| (02) MESSAGE LENGTH ||
| (04) REMOTE DATA CORRELATOR ||
|  ||
| (08) REMOTE DLC DATA LINK CORRELATOR ||
|  ||
| (12, 13) RESERVED ||
| (14) MESSAGE TYPE | (15) FLOW CONTROL BYTE |

910 points to the REMOTE DATA CORRELATOR row.

SSP DATA FRAME HEADER

FIG. 9

FUNCTIONAL BLOCK DIAGRAM OF X.500 DIRECTORY SERVICE

US 6,680,942 B2

DIRECTORY SERVICES CACHING FOR NETWORK PEER TO PEER SERVICE LOCATOR

RELATED APPLICATIONS

The following United States Patent Application is related to the present invention: U.S. patent application by Patrick Pak-Chiu Leung, Meng-Hsiung Lyu, and Anson Chen entitled Technique for Accessing Heterogeneous Directory Services in an APPN Environment, application Ser. No. 09/097,957, filed on Jun. 16, 1998.

FIELD OF THE INVENTION

This invention relates to peer to peer transport services provided by routers or switches, etc. in a computer network, and more particularly to directory services provided for peer entities.

BACKGROUND OF THE INVENTION

A router can provide peer to peer services for routing packets on a computer network. For example, a router, which is generally a layer 3 switching device since it depends upon the IP destination address for routing decisions, may provide layer 2 switching service such as DLSw switching. DLSw switching is an example of peer to peer services provided by a router.

An example of peer-to-peer routing is the Advanced Peer to Peer Network (APPN) method developed by IBM Corporation. The APPN system developed from an earlier system having a mainframe computer controlling all networking functions, including route computations. The mainframe connects to "nodes," and the nodes connect to terminals, either directly or indirectly through terminal controllers. Packets were routed through the network of nodes by source routing, where the mainframe computer computed the path for source routing. In APPN, a group of nodes are defined as "peer" nodes. Links are established between peer nodes, for example by leased telephone lines, etc. End stations are attached to peer nodes, either directly or indirectly through "terminal controllers". Those end stations attached to a peer node are said to be in the "domain" of the peer node. The SNA architecture is described by Andrew Tanenbaum in his book *Computer Networks Second Edition*, published by Prentice Hall Publishing Co., Copyright 1988, all disclosures of which are incorporated herein by reference, especially pages 46–47. When a source logical unit in a source station decides to set up a "conversation" with a "destination logical unit" in another station, the peer node whose domain the source end station is in computes a route through other peer nodes and links of the APPN system. The first end station then addresses its packets for the conversation by means of the route computed by the peer node. The packet travels through the APPN network as a source routed packet as it travels along the computed route. In computing the route, the peer node makes use of a database of peer nodes, links, characteristics of links, and available logical units. The peer node then computes an optimum route, with the optimum being dependent upon route characteristics requested by the source end station. When a packet arrives at a peer node for routing to a destination station, no decision about identifying the protocol of the packet need be made, as all packets are under the same protocol, the APPN protocol. Each node in the APPN network may keep a cache of a Directory Database for locating peer nodes, as explained by Jesper Nilausen in his book *APPN Networks*, published by John Wiley & Sons, Copyright 1994, all disclosures of which are incorporated herein by reference, especially pages 43–50. Problems with directory databases cached in each node arise when many nodes broadcast to find the same end station, and the consequent use of considerable network bandwidth for redundant searches.

A further example of peer to peer routing services comprises DLSw, or Data Link Switching, as defined in RFC 1795 published by the Internet Engineering Task Force in April 1995, and available from the Web Site at URL www.ietf.org. All disclosures of RFC 1795 are incorporated herein by reference.

In the DLSw peer to peer example, when a router receives a packet, the router determines whether the packet is to be forwarded by DLSw protocol. For example, the router may have local area networks (LANs) using a variety of protocols connected thereto, and the router must determine the protocol of the packet. The router determines the protocol of the packet by identifying the port on which the packet arrived at the router, by reading fields of the packet at various offsets from the beginning of the packet, etc. In the event that the router determines that the packet is to be forwarded by DLSw protocol, the packet is encapsulated with a SSP header (as defined in RFC 1795), a cyclic redundancy check (CRC) trailer field, and some other fields. The encapsulated packet is then transmitted over a TCP/IP connection to a peer router, which also provides DLSw service. The TCP/IP connection is established through a network "cloud" potentially having many routers providing DLSw service connected thereto.

A router providing DLSw service is referred to herein as a "DLSw router". The DLSw service is referred to as "DLSw switching", as the service occurs in layer 2 of the Internet Protocol.

In some networks, a DLSw router may be connected to only one LAN, for example a source routing bridged (SRB) network based on IEEE 802.5 token rings and bridges. Packets received by the DLSw router from the SRB network may all be routed using the DLSw protocol. In other networks, a router may have a port connected to an IEEE 802.5 token ring, may have another port connected to an IEEE 802.3 Ethernet LAN, an FDDI token ring LAN, etc. An IEEE 802.5 token ring may have packets transmitted thereon under SNA protocol, and addressing of SNA packets to the destination station is in layer 2 fields. An IEEE 802.3 Ethernet packet has addressing to the destination station in layer 2 and in layer 3 fields. Also, packets transmitted under TCP/IP protocol have addressing to the next hop router in layer 2, and to the destination station in the layer 3 IP destination address field, etc. The router receiving packets from a variety of LAN technologies and LAN protocols reads the address fields and makes routing decisions. In the event that a packet is routed from a first LAN using a protocol which is incompatible with the protocol of the next LAN, then the router must re-build the packet before transmitting the packet onto the next LAN. For some packets, the decision is to route the packets by DLSw switching.

In the event that the routing decision is to route a packet by DLSw switching, then a router on the same LAN as the source end station, hereinafter the "source LAN" and the "source router", finds a peer router (hereinafter the "destination router") offering DLSw service, where the destination router can reach the destination end station. The destination router is ordinarily connected to the same LAN as is the destination end station, hereinafter the destination LAN. The source router must identify the proper peer router to serve as the destination router.

Routers offering DLSw service transfer encapsulated packets between themselves using TCP/IP protocol through a network cloud, and they are referred to as "peer DLSw routers". There may be many, for example, a few hundred peer DLSw routers communicating through a TCP/IP network cloud, and for a further example, there may be several thousand. A source DLSw router that receives a packet from an end station and makes a routing decision that this packet is to be encapsulated and routed under DLSw protocol must select the proper destination DLSw router. The source router then places the destination router address in the proper fields of a TCP/IP packet so that the selected destination DLSw router receives the encapsulated packet through the TCP/IP network cloud. Upon receipt of the encapsulated packet by the destination DLSw router, the destination DLSw router removes the encapsulation and transmits the packet onto the proper LAN so that the destination end station can receive the packet.

Selection of the destination router by the source router is ordinarily accomplished by the source router first checking an internal cache (hereinafter the DLSw cache) in order to learn if it already knows the proper destination router for the destination end station specified by the destination address of the packet. In the event that the DLSw cache in the source router does not have the necessary information, the source router then transmits a "CANUREACH" message to each of its DLSw router peers, as defined in RFC 1795. The CANUREACH message includes the address of the destination end station in an appropriate field, and any router receiving the message then checks its routing tables in order to determine if the router is connected to a LAN also connected to the destination end station. In the event that a router receiving the CANUREACH message determines that the destination end station is absent from its routing tables, then the router transmits a "search message".

A search message is transmitted by the router receiving the CANUREACH message onto all of the LANs connected to the router in order to look for the destination end station. For example, in the event that the Destination End Station uses SNA protocol, the search message is a LLC1 TEST FRAME; as a further example, in the event that the Destination End Station uses NetBios protocol, the search message is a NetBios NAME QUERY, NET_BIOS_NQ frame, etc. The end station, after receiving a search message, responds to the router transmitting the search message with a "response message". A response message, for example when the Destination End Station uses SNA protocol, is a LLC1 TEST_RESPONSE message; as a further example, in the event that the Destination End Station uses NetBios protocol the response message is a NAME_RECOGNIZED, NETBIOS_NR frame, etc.

Upon receipt of the response message, the router updates its routing tables with the address of the sought after destination end station. In the event that a peer DLSw router determines that it can reach the destination end station, then that DLSw router sends an "ICANREACH" message (as defined in RFC 1795) to the source router. The source router receives the ICANREACH message and thereby identifies that peer DLSw router as the destination router. The source router uses the address of the identified destination router to both: build the SSP header in order to address the encapsulated packet to the destination router; and, to populate its DLSw cache so that in the event that the source router receives another packet addressed to the same destination end station, it can learn the proper destination router simply by its first action of checking its DLSw cache.

A first problem in the above method of a source router finding a peer DLSw router to identify as the destination router is that with hundreds of peer DLSw routers, the overhead in transmitting CANUREACH messages occupies too much network bandwidth. A second problem is inefficiency of operation, in that if one router locates the proper destination router for a particular destination end station, then in the event that a second router receives a packet addressed to the same destination end station, the second router must go through the full CANUREACH protocol as the routers do not share their DLSw cache contents. A third problem is that a DLSw cache entry must be timed out fairly quickly, in the order of 10 minutes to an hour, in order to have fresh data in the cache as network conditions change, that is, as routers fail, network links fail, new links are established, etc. Timing out of the various DLSw caches in the various peer routers results in even more network bandwidth being devoted to CANUREACH messages, ICANREACH messages, and request and response messages onto local LANs looking for an end station, by the various peer routers. A fourth problem in commonly used design practice of routers is that there is no limit set on the number of entries in the local reachability cache. No limits are set because it is desirable to have a destination address in the local reachability cache in order to avoid a broadcast of CANUREACH messages. In the event that the reachability cache grows large, the cache may hog too much memory of the router.

SUMMARY OF THE INVENTION

The problem of too much overhead being used in transmitting CANUREACH messages by DLSw routers asking their peer routers to locate a desired destination address is solved by a new directory service for peer routers.

The new directory service is established for a peer router receiving a data packet from an end station on a local area network connected to a port of the peer router, the receiving peer router hereinafter being referred to as the source router. The data packet is to addressed to a destination address. The source router determines that the data packet is to be encapsulated as an encapsulated packet, and the encapsulated packet routed by a peer to-peer protocol to a destination router. The destination router then transmits the packet onto a local area network to the destination address. The source router locates the proper peer destination router by use of the new database. The database is maintained on a server, where the database has entries for destination address, and an entry for a particular destination address gives the address of one or more peer routers capable of routing a packet to that particular destination address. The database is populated by peer routers updating the database with information concerning the destination address which the peer routers can reach. The database on the server is interrogated by the source router to learn the address of a destination peer router. An encapsulated packet is then addressed by the source router to the destination peer router, and the encapsulated packet is transmitted onto a connectionless, but connection-oriented, network for routing to the destination peer router. The connection-oriented protocol employed may be conveniently the TCP/IP protocol.

The database may be accessed with a lightweight data access protocol (LDAP). The peer-to-peer routing protocol may be DLSw protocol. Data frames transmitted by DLSw protocol are encapsulated with an SSP header for transmission by TCP/IP protocol from the source router to the destination router. The encapsulated packet is received by the destination router, de-encapsulated, and transmitted by the destination router as a destination packet onto a local area network having the destination address connected thereto, and the destination packet is addressed to the destination address. The database may be maintained in accordance with the X.500 directory standard. The database may be interrogated using the lightweight data access protocol (LDAP).

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 4 is a block diagram of a Reachability Table having multiple database entries.

FIG. 9 is a block diagram of a SSP data message header.

DETAILED DESCRIPTION OF AN ILLUSTRATIVE EMBODIMENT

Figure 1:
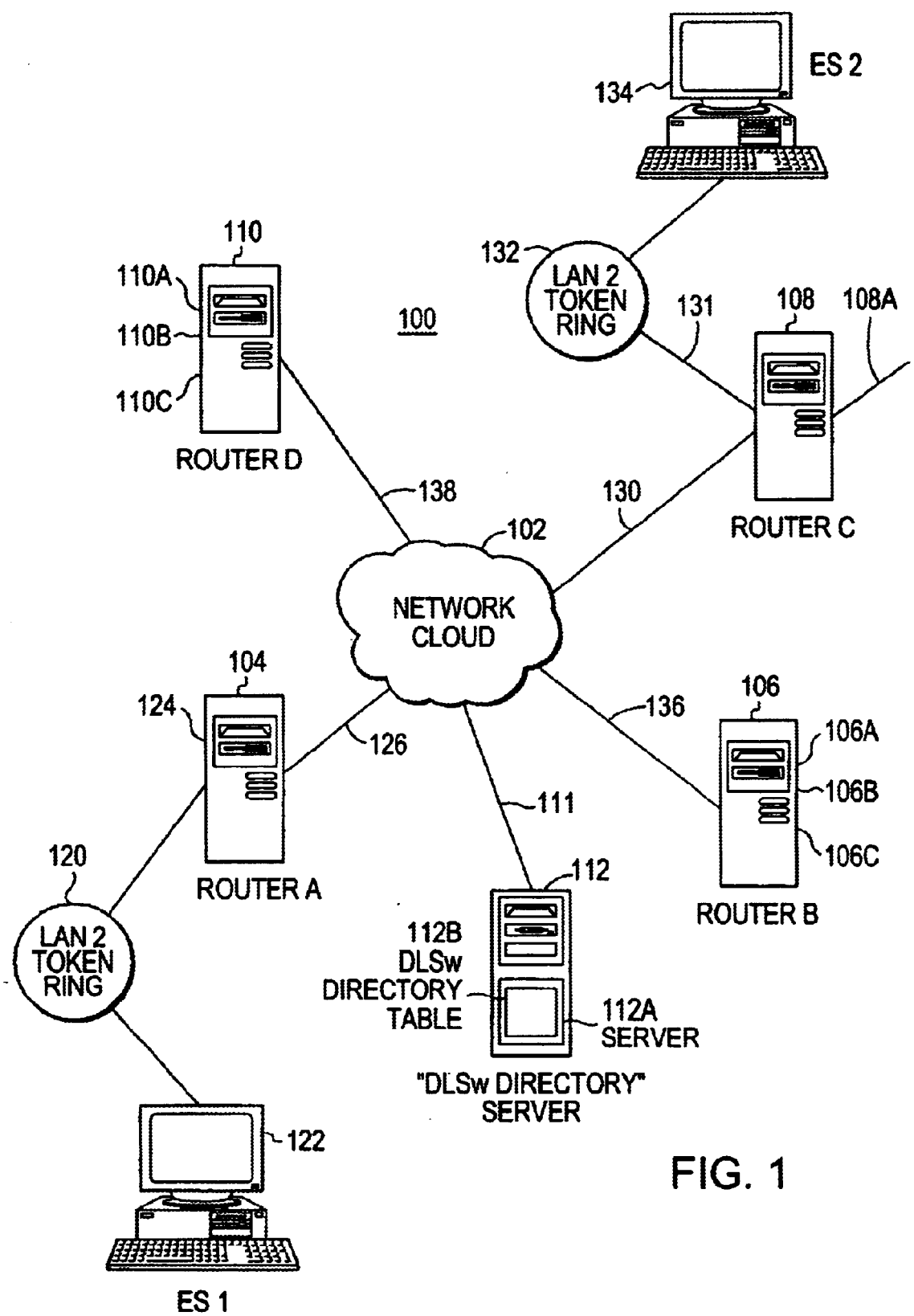
FIG. 1 is a block diagram of a computer network in accordance with the invention.

Turning now to FIG. 1, network 100 comprises a computer network cloud 102 having a plurality of routers 104, 106, 108, 110, 112, etc. connected thereto. Network cloud 102 is a shorthand tool for describing many routers interconnected to form a possibly large computer network. For example network cloud 102 may represent only a few routers forming a network internal to a small business, or for example, network cloud 102 may represent all of the computers and routers forming the worldwide Internet. A more common situation is that network cloud 102 represents around a few hundred routers interconnected within a corporate Intranet, and the routers exchanging packets using the DLSw protocol.

Router 104 is connected to IEEE 802.5 token ring LAN 120, and end station ES1 122 is one of many (not shown) end stations connected to token ring 120. LAN 124 also connects to router 104. LAN 124 may be: for example, another IEEE 802.5 token ring; or for example, LAN 124 may be an IEEE 802.3 Ethernet; or for example LAN 124 may be any other convenient LAN. Router 104 connects by connection 126 to other routers and computers in network cloud 102.

Router 108 connects to network cloud by connection 130. Router 108 also connects to token ring LAN 132 by connection 131. End station ES2 134 is one of many (not shown) end stations connected to token ring LAN 132. Router 108 also connects to IEEE 802.3 Ethernet LAN 108A.

Router 106 connects to network cloud 102 through connection 136. Router 106 also connects to a plurality of LANs, for example LAN 106A, LAN 106B, and LAN 106C. Also, router 110 is shown connected to network cloud 102 through connection 138. Router 110, in turn, connects to a plurality of LANs, for example LAN 110A, 110B, and 110C. The various LANs shown 106A, 106B, 106C, 110A, 110B, 110C, etc. may be IEEE 802.5 token rings, may be IEEE 802.3 Ethernet LANs, or may be LANs based on some other convenient network protocol, just as LAN 124, as was mentioned above, may be any convenient LAN.

Computer 112, wherein server 112A is implemented, is connected to network cloud 102 by connection 111.

Figure 2:
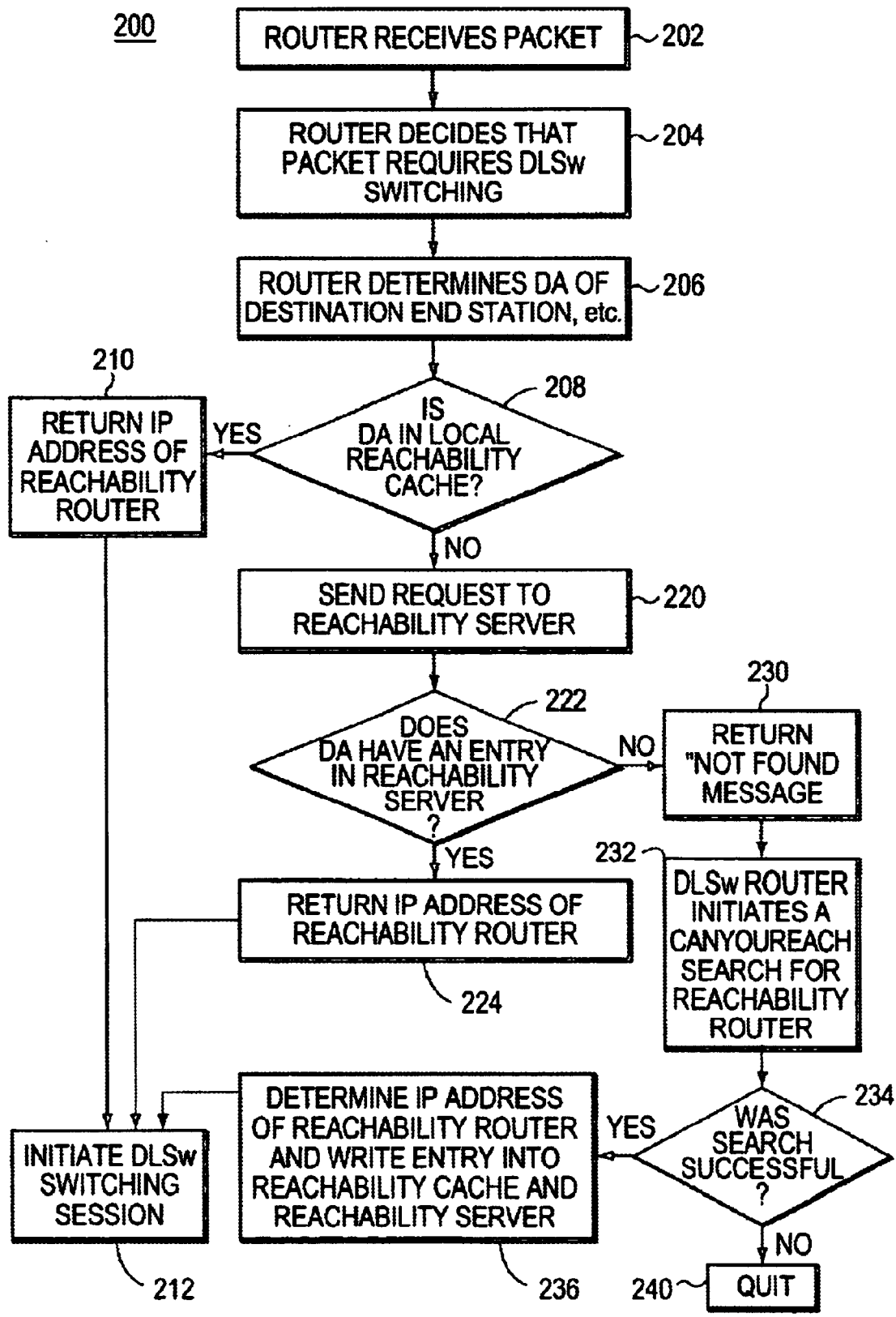
FIG. 2 is a flow diagram of a DLSw router in accordance with the invention.

Turning now to FIG. 2, there is shown a flow diagram 200 of a process initiated by a DLSw router in accordance with the invention. Various parts of the process of flow diagram 200 run in many different computers: the router initiating the process 200; a Reachability Server; many peer DLSw routers who receive a broadcast CANUREACH message; many end stations who receive "search messages" from the DLSw peer routers; etc.

At block 202 the router receives a packet from a LAN, and the process goes to block 204. At block 204 the router decides that the packet will be routed using DLSw switching, and the process goes to block 206. At block 206 the router determines the layer 2 destination address (DA address) of the destination end station, etc. For example, the router reads the MAC destination address from the layer 2 header of a SNA protocol packet, or for further example, the router determines the NetBios address of the packet, etc. The process then goes to block 208. At block 208 the router checks its DLSw reachability cache in order to determine if the DA address of the packet is saved in the cache. In the event that the DA, etc. of the destination end station is in the reachability cache of the router, then the process goes to block 210. At block 210 the reachability cache returns the layer 3 address, the IP address, of the reachability router. The reachability router is a DLSw router connected to the LAN of the destination end station, and which can route a packet to that LAN for reception by the destination end station. The process then goes to block 212 and initiates a DLSw switching session to the reachability router.

In the alternative event that block 208 decides that the DA is not in the reachability cache of the router, then the process goes to block 220. At block 220 the router sends a request to the Reachability Server, and the process goes to block 222. At block 222 the Reachability Server determines whether or not it has an entry for the DA, etc. of the destination end station. In the event that there is an entry for the DA of the destination end station in the Reachability Server, the process goes to block 224. At block 224 the Reachability Server returns the layer 3 address, the IP address, of the reachability router to the inquiring router, and the process goes to block 212. At block 212 the router initiates a DLSw switching session with the reachability router.

In the alternative event that block 222 determines that there is no entry for the DA in the Reachability Server, then the process goes to block 230. At block 230 the Reachability Server transmits a message to the router informing the router that the DA does not have an entry in the Reachability Server, and this message is commonly referred to as "Not-Found" message. The process then goes to block 232.

At block 232 the router broadcasts a CANUREACH message onto an IP network in accordance with the RFC 1795 protocol. In the event that a peer router on the IP network determines that it can reach the DA of the destination end station, then the peer router returns a "ICANREACH" message to the router, and the process goes to block 234. At block 234 the process determines if the search for a reachability router were successful. In the event that a reachability router for the DA of the destination end station was discovered, then the process goes to block 236. At block 236 the router determines the layer 3 address, the IP address of the reachability router, and both writes the entry for the DA of the destination end station along with the IP address of its reachability router into its local reachability cache, and transmits the entry for the DA of the destination end station along with the IP address of its reachability router in a message to the Reachability Server. The Reachability Server receives the message. The Reachability Server, in response to receiving the message, creates an entry for the DA of the destination end station in its Reachability Table. From block 236 the process goes to block 212. At block 212 the process initiates a DLSw switching session to the destination end station.

In the alternative event that block 234 determines that the search for a reachability router which can reach the DA of the destination end station as not successful, the process goes to block 240 and quits. After the process quits at block 240 process 200 takes no further action. The router then times out while waiting for a response from the server, and in response to the timeout, takes no action. The source end station then times out, and by the timeout learns that the desired destination end station cannot be found.

Turning now to a further discussion of operation of network 100, network 100 may route a packet from end station ES1 122 as a source end station through network cloud 102 to end station ES2 134 as a destination end station. For example, when a SNA packet transmitted by end station ES1 onto token ring LAN 120 arrives at router 104, then router 104 examines the headers of the packet and determines the MAC address of the destination station (the DA in the MAC header). Router 104 also determines that the received packet is to be switched by DLSw protocol through a TCP/IP connection to another router connected to network 100. Next router 104 consults a cache containing a Reachability Table contained within router 104 of MAC DA addresses and NetBios names.

The reachability table is indexed by the address of the destination end station (MAC DA from the packet, NetBios name from the packet, etc.), and the IP address of the reachability router is obtained from the Reachability Table.

Figure 3:
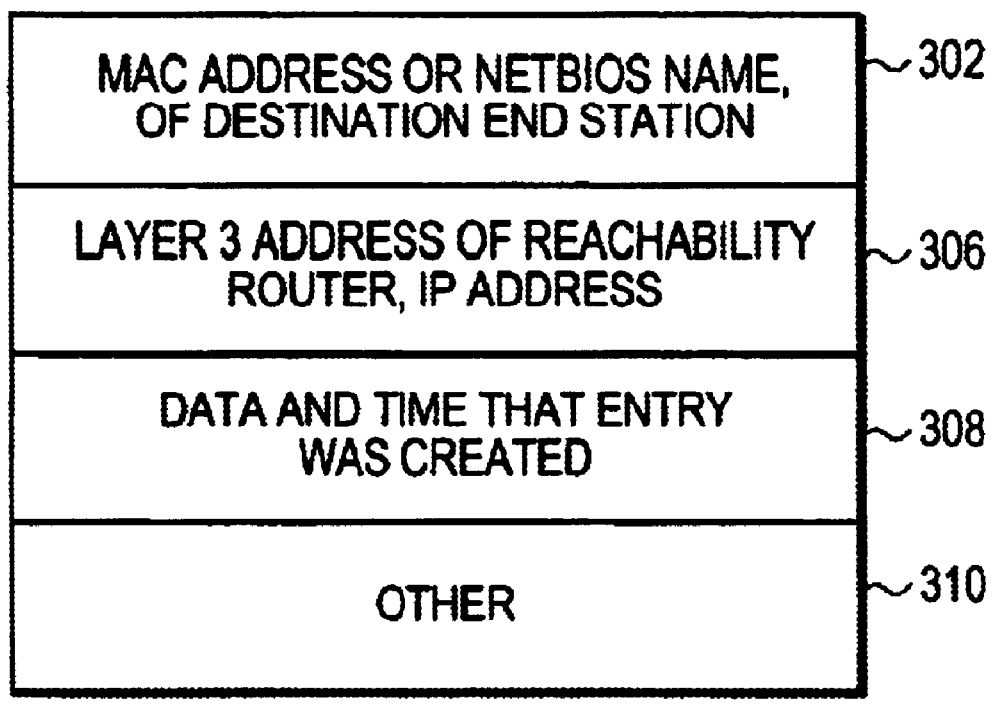
FIG. 3 is a block diagram of a field in a Reachabililty Database.

For example, FIG. 3 gives the fields 300 in the Reachability Table maintained in a cache within router 104. Fields 300 in Reachability Table are identified with IEEE 802 protocol standard terminology, as well as other protocol terminology. Field 302 contains the layer 2 address of the destination end station. The layer 2 address may be the MAC address of the destination end station for SNA protocol, the MAC address for other protocols, or for example, the NetBios name, etc. Field 306 contains the layer 3 address, that is the IP address, of the reachability router. The reachability router is a router which can reach the destination end station. Thus, after the packet is encapsulated with an SSP header in accordance with RFC 1795, then the encapsulated packet is routed according to the TCP/IP connection-oriented protocol to a reachability router. Then the reachability router transmits the packet onto a local LAN to the destination end station.

Field 308 contains the date and time, which the entry was created. The date and time of entry are used in a logical check in order to determine if the entry has expired. It is necessary to expire the entry in order to avoid caching obsolete information because of the dynamic nature by which computer networks change with time, for example new routers coming on line, old routers failing, links failing, new links being established, etc. Field 310 contains other information, or other fields, which may be useful to establishment of a connection to the destination end station, destination logical unit under SNA protocol, etc.

In the event that router 104 finds the destination address which it read from the received packet in a valid entry in its internal Reachability Cache, then it uses the address of the Reachability Router found in field 306 to build the SSP header. Once the SSP header is built and encapsulation complete, then router 104 transmits the DLSw encapsulated packet into network cloud 102 where it makes its way under TCP/IP protocol to the Reachability Router, in this example router 108.

In the contrary event, that router 104 does not find the destination address which it read from the received packet in a valid entry in its internal Reachability Cache, then router 104 contacts Reachability Server 112A. In the present example, Reachability Server 112A is thought of as a computer program executing in DLSw Directory Server 112. Reachability Server 112A maintains a Reachability Table 112B having fields identical to those of the Reachability Cache found in router 104 as shown in FIG. 3, but the entries in Reachability Server 112A are supplied by all routers providing DLSw service in a domain of Reachability Server 112A. Thus, if any DLSw router in the domain of Reachability Server 112A has updated Reachability Table 112B within the expiration time interval of the table, then router 104 will find an entry for the destination address by searching in field 302 of the entries in the Reachability Table. The search in field 302 is indexed on the address (MAC, NetBios name, etc.) of the destination end station 134.

In the event that Reachability Server 112A finds the requested MAC destination address, MAC DA, then the table fields 300 are transmitted to router 104. Router 104 then both updates its cache with the new entry, and also uses the entry to build the SSP header to transmit the encapsulated packet through connection 126 under TCP/IP protocol, and addressed at layer 3 to the reachability router 108. Router 104 determines the route to reachability router 108 from the layer 3 address (IP address) as learned from Reachability Server 112A, by ordinary connectionless IP routing techniques.

In the event that Reachability Server 112A does not find the requested MAC destination address, then Reachability Server 112A returns an "address not found" message to the requesting router, router 104. Router 104 then transmits a Broadcast Request message onto network cloud 102. The broadcast request message is a CANUREACH message as defined in RFC 1795, and requests the destination address which router 104 read from the received packet. All DLSw routers connected to network cloud 102 receive the Broadcast Request message. Each router which receives the CANUREACH message checks its tables for the requested destination address, and in the event that it does find the address, the router sends an ICANREACH message, again as defined in RFC 1795, to Router 104.

In the alternative event that a router receiving a CANUREACH message does not have the requested destination address in its tables, then that router broadcasts a search request message onto all of the LANs connected to it. The broadcast search request message may be a SNA TEST FRAME, a NetBios NAME QUERY, etc., depending upon the protocol of the LAN. Hopefully at least one of the end stations receiving the search request message will recognize its address in the search request message, and will transmit a response to the router transmitting the search request message. That router, after receiving the response from the end station, transmits an ICANREACH message to the router originating the CANUREACH message, in this example router 104.

In the present example, router 108 is the reachability router, and router 108 sends the ICANREACH message to source router 104. Source router 104 then updates its internal reachability cache, and also sends an update message to reachability server 112A. Reachability Server 112A then updates its reachability table. Router 104 then encapsulates the packet with an SSP header and addresses it to the destination router 108, which is the reachability router.

Upon receipt of the DLSw encapsulated packet, router 108 de-encapsulates the packet and builds a packet suitable for the protocol of the destination LAN. In the present example, the destination LAN 132 is assumed to be a IEEE 802.5 token ring network and the packet is transferred according to that protocol. End station 134, or a logic unit within end station 134 receives the packet from token ring LAN 132. Alternatively, the destination network could be an IEEE 802.3 Ethernet network such as LAN 108A (not shown connected end station ES2 134), and router 108 would transmit a properly prepared Ethernet packet onto the Ethernet network.

Turning now to FIG. 4, a Reachability Table 112B is shown. Field 302, the Destination Address of the desired end station occupies column A. Field 306, layer 3 address of the reachability router occupies column B. Field 308, date and time that the entry was created, occupies column C. Field 310, other fields or data, occupies column D. Rows of table 112B hold entries for various destination addresses. For example, MAC address under IEEE 802 are shown in rows 2–25. For further example, NetBios addresses are shown in rows 27–40. A search of Reachability Table 112B is indexed on field 302, the destination address. When reachability server 112A finds the destination address desired, then the entry in field 308 of column C is used in order to determine if the entry has expired or if it is still a valid entry. In the event that the entry is valid, the layer 3 address of field 306 of column B is used in the DLSw packet to send it to the DLSw reachability router. With this layer 3 addresses, the encapsulated packet can reach the reachability router under TCP/IP connection-oriented protocol through connectionless network routing. Connectionless networks are thoroughly described by Radia Perlman in her book *Interconnections,* particularly at Chapter 7, pages 165–191, as mentioned hereinbelow.

Multiple entries for a particular destination end station are shown in Reachability Table 112B. As shown in detail in FIG. 11, more than one router may be able to reach a particular end station. Each router capable of reaching a particular end station will respond to the CANUREACH message transmitted by a source DLSw Router by returning a ICANREACH message. The different responses for reachability to a particular end station are retained in the Reachability Table of FIG. 4. In an exemplary embodiment of the invention, Reachability Table 112B is implemented to hold from 1 to 4 entries for each destination end station. That is, Reachability Table 112B has entries giving IP addresses of up to four (4) routers which can transmit a message to the desired end station.

In an exemplary embodiment of the invention, the first valid path (or reachability router) learned is used to route the message. The path is valid if it has not timed out. As an alternative, all possible valid paths are used in a round robin fashion. For example, entry 1 is used to set up the first circuit, then entry 2 is used to set up the second circuit, entry 3 is used to set up the third circuit, etc.

Operation of process 200 can be summarized by the following Table 1.

TABLE 1

1. Source Router Receives a Frame
2. Source Router Reads DA from Layer 2 Header of Frame
3. Source Router Determines that DLSw Switching is Required
4. Source Router Determines that no DLSw Session is Set Up for this Frame
5. Source Router Finds Peer DLSw Router Address
 by
  Check Local Cache
  IF entry found, initiate DLSw Session
  IF NO entry found Check Reachability Server
6. Reachability Server (Responsive to Inquiry from Source Router):
  Checks Its Reachability Table
  IF entry found, return to Source Router, Source Router Initiates DLSw Session
  IF NO Entry in Reachability Table,
   then
  Reachability Server returns a "Not Found" message
7. Source Router (Responsive to "Not Found" message)
  Broadcasts a CANUREACH message to Peer DLSw Routers
   Each peer DLSw Router performs a search on its LANs
  If no peer router returns an ICANREACH message, the process quits
  If one or more peer routers do return an ICANREACH message;
   then
   Source Router creates an Entry correlating the DA of the Destination End Station and the IP Address of the Reachability Router for each returned ICANREACH message
    and
   Source Router writes each Entry to its Local Reachability Cache
    and
   Source Router Transmits each Entry to the Reachability Server
    and
   Source Router Initiates a DLSw session with one of the Reachability Routers Table 1 sets out operation of the source router and the Reachability Server as follows. First, at Entry 1, a packet is received by the router. At Entry 2, various of the address and control fields of the received packet are read and the MAC address of the destination end station is determined. Any of the fields such as: layer 2 header 604, comprising destination address DA 622, source address SA, LLC type indicator 626, organizationally unique identifier 628, type 630, and other layer 2 fields such as RIF (not shown) or others as represented by field 632 provide the router with information as the router decides what type of routing or bridging the packet requires.

At entry 3 the router determines that DLSw switching is required by the packet. Also, at entry 3 the router may determine that peer-to-peer encapsulation is required by the packet using any number of alternative protocols such as, for example: DLSw switching according to RFC 1795; ISL encapsulation (a switch-to-switch link protocol proprietary to Cisco Systems Corporation); or any other peer to peer encapsulation. The remaining focus is on DLSw peer to peer switching.

At Entry 4 the router determines that no DLSw session for the packet is currently active.

At Entry 5 of Table 1 the router checks its local cache by searching for an entry indexed by the destination entity, for example end station 134, or for example a MAC address of a logical unit in a distant APPN network, or for further example a NetBios name in a distant NetBios network, etc. The router maintains a Reachability Cache similar to Reachability Table 112B as discussed with reference to FIG. 3 and FIG. 4, and it is in this reachability cache that the router makes the search of Entry 5 of Table 1. In the event that the router finds an entry for the destination end station in its reachability cache, the router initiates establishment of a DLSw session to a reachability router and to the destination end station.

In the event that the router does not find the destination entity in its reachability cache, then the router goes to Entry 6 of Table 1. At Entry 6 the router transmits an inquiry message to reachability server 112A, located in the DLSw Directory Server 112. Reachability server 112A maintains reachability table 112B, as discussed with reference to FIG. 3 and FIG. 4. The entries in reachability table 112B are obtained by reachability server 112A from receiving updates from routers which are peers to router 104, and there may be as many as several hundred, or even several thousand peer routers serviced by reachability server 112. Therefore, if any peer router has made a similar inquiry for the destination entity such as end station 134 as being requested by router 104 in the present inquiry, there will be an entry in reachability table 112B. The date and time of creation of the entry are checked against present time in order to determine if the entry has expired, and in the event that the entry has not expired, the reachability server 112A transmits a response message to router 104 with the information in the entry for end station 134. The information contains the layer 3 address, IP address, of reachability router 108. Router 104 then populates its reachability cache with the information, and builds the packet for transmission to destination router 108 in order to establish the peer to peer switching session, ultimately to reach destination end station 134.

In the event that the entry in reachability table 112B has expired, or in the event that there is no entry in the reachability table 112B for the destination entity end station 134, then reachability server 112A transmits a "Not Found" message to router 104.

At Entry 7 of Table 1, in response to receiving the "Not Found" message, router 104 transmits (typically a broadcast message) a CANUREACH message to each of the peer DLSw routers such as routers 104, 106, 108, 110, etc. The CANUREACH message is described in RFC 1795, along with the expected response of the receiving routers. Upon receipt of the CANUREACH message, the receiving router checks its routing tables to determine if it has knowledge of the destination entity. In the event that the router does have the destination entity in a valid entry in its local reachability tables (or their equivalent) then the router transmits the information in the entry to router 104 via an ICANREACH message. Router 104 then does the following: updates its reachability cache, transmits the information to reachability server 112A,; and, builds a DLSw packet to establish the DLSw switching session and transmits it to the router returning the ICANREACH message.

In the event that a peer router does not find the destination entity in its routing tables, then the peer router broadcasts search messages, (SNA TEST FRAMES, Net Bios NAME QUERY, etc.) onto all of the LANs connected to it, and then listens for the requested destination entity to respond. In the event that the router receives a response from the requested destination entity, then the router packages the information into a ICANREACH message and transmits it to router 104. Also, the router caches the response from the requested destination entity into its routing tables.

Ordinarily source router 104 will receive only one response from a router claiming to be able to reach the desired destination entity, for example end station 134. However, in the event that there are several routers connected to the LAN to which the destination end station is connected, then each of these routers will return a ICANREACH message to source router 104. Accordingly, a Reachability Table such as shown in FIG. 4, is implemented to hold multiple entries for a given destination end station.

Figure 5:
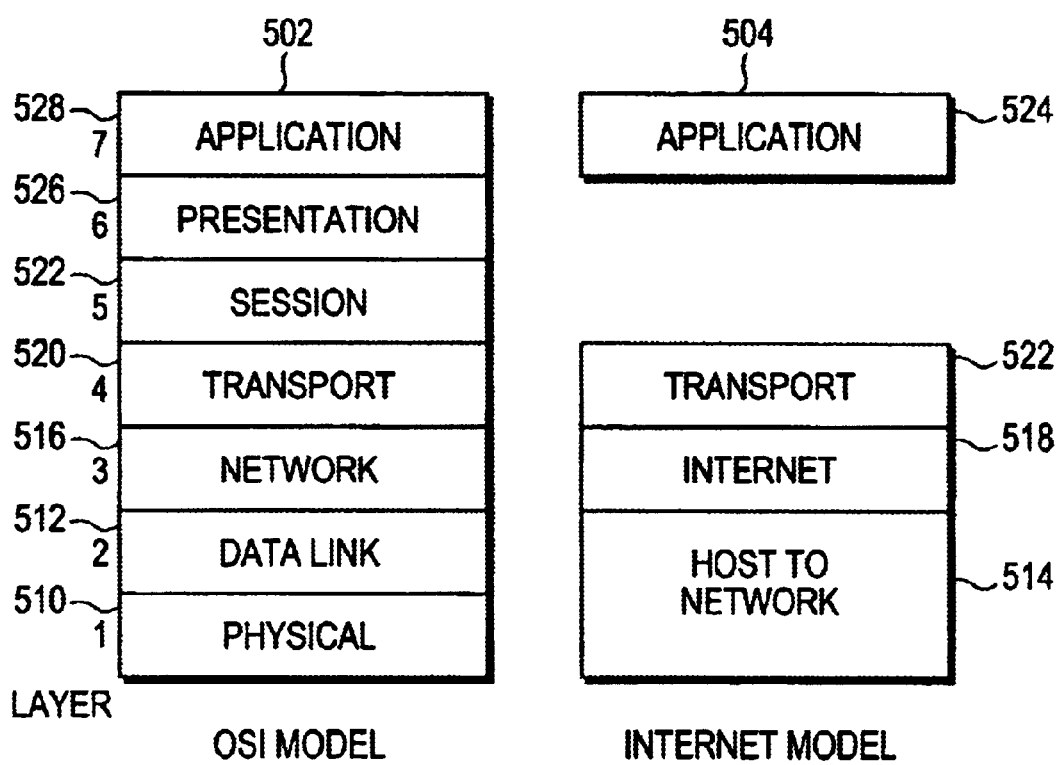
FIG. 5 is a block diagram comparing an OSI communications model with an Internet communications model.

Turning now to FIG. 5, a block diagram giving a comparison between the OSI communications model 502 and the Internet reference model 504 is shown. Layer 1 the physical layer, and layer 2 the Data Link layer of the OSI model 502 are represented in the Internet model as the "Host to Network" layer 514. The physical layer 510, layer 1, represents the physical network connection, including wires, optical cables, satellite links, etc. The data link layer 512, layer 2, represents the logical processes required to move a frame from a source computer to a destination computer. Data link layer 512 in a receiving computer responds to the layer 2 address of frames, where the layer 2 address may be a NetBios name of a logic unit in a SNA packet, may be the MAC address in an IEEE 802 standard packet such as an IEEE 802.5 token ring or IEEE 802.3 Ethernet, may be an Appletalk address, a Novel network address, etc. Some layer 2 protocols provide best effort, but not guaranteed delivery, packet transfer service; while other protocols, for example, LLC Type 2 service, provide guaranteed delivery of packets by use of ACK messages and sequence numbers in packets.

Layer 3 the Network layer 516 in the OSI model is represented by the Internet layer 518 of the Internet model. The Internet layer 518 is also often referred to as the "IP" layer. Layer 3 in a receiving computer responds to the Internet address in TCP/IP format, or to the layer 3 address in any other protocol. Layer 3 addressing provides best effort, but not guaranteed delivery, packet transfer from a source computer to a destination computer, for example, in TCP/IP protocol.

Layer 4 the transport layer 520 in the OSI model is also referred to as the transport layer 522 in the Internet model. Layer 4 provides guaranteed packet delivery, for example in the TCP/IP protocol. Layer 4 keeps track of packet sequence numbers, reorders packets when they arrive out of order, sends ACK messages when packets are correctly received, and transfers correctly received information to the next higher layer in the model.

In the Internet model the next higher layer from the transport layer 522 is the application layer 504. At the application layer 504 received information is passed on to application programs, for example, e-mail programs, etc. In contrast, in the OSI model information is utilized in two further layers, the session layer 524 and the presentation layer 526 before reaching the application layer 528. Details of the various layers are described by a number of authors in their books, including: Andrew Tanenbaum, *Computer Networks, Third Edition,* published by Prentice Hall, Inc. Copyright 1996; Radia Perlman Interconnections, published by Addison Wesley Longman, Inc., Copyright 1992; Douglas E. Comer *Internetworking With TCP/IP, Vol.* 1, *Vol.* 2, *Vol.* 3, *Third Edition*, published by Prentice Hall, Inc. Copyright 1995; and Douglas E. Comer, *Computer Networks and Internets,* published by Prentice Hall, Inc., Copyright 1997; all disclosures of which books are incorporated herein by reference.

Figure 6A:
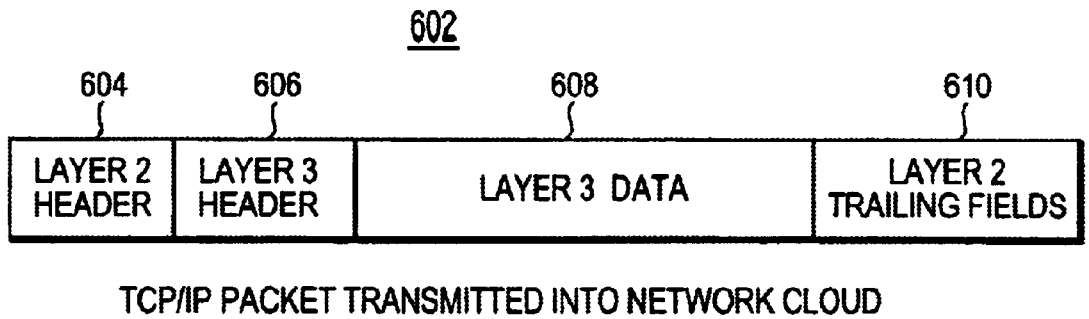
FIG. 6A is a block diagram showing layer 2 and layer 3 headers of a packet.

Turning now to FIG. 6A, a typical TCP/IP packet 602 transmitted by router 104 onto network cloud 102 is shown.

Packet format will vary depending upon the technology used for the connection between router 104 to the next router (not shown) in the network cloud 102, however the packet format of FIG. 6A is typical. Field 604 is an exemplary layer 2 header and contains the layer 2 address of the reachability router. As mentioned above, reachability table 112B as shown in FIG. 4 is indexed by the layer 2 address of the intended destination station, and that layer 2 address is in entry 302 of FIG. 3 and in column A in FIG. 4. FIG. 3 is one record of the Reachability Table of FIG. 4.

Field 606 contains the layer 3 address as found by router 104 in field 306 of entry 300 in reachability table 112B in reachability server 112A. Field 306 of FIG. 3 contains the layer 3 address, also known as the IP address, of destination router 108. Equivalently, the layer 3 address of destination router 108 is found in column C of reachability table 112B as shown in FIG. 4.

The router which receives a packet and decides to route the packet using DLSw switching finds the layer 3 address (IP address) of the reachability router in field 306, and then the router uses standard IP routing processes to route the packet to the reachability router.

Alternatively, in the event that there is a serial line point-to-point connection between the source DLSw router and the destination DLSw router (not shown in a figure), the source router simply uses the IP address of the destination DLSw router to determine which of its output ports to which it should route the packet. The packet is then transmitted from that output port of the source DLSw router using whatever protocol is established on the serial point-to-point line.

Field 608 of FIG. 6A contains data, particularly the SSP packet encapsulated for DLSw switching. Finally, field 610 contains trailing fields of the packet, and the exact trailing fields depends upon the technology used for the connection 126 from router 104 into the network cloud 102. A cyclic redundancy check (CRC) field is normally included in fields 610.

Figure 6C:
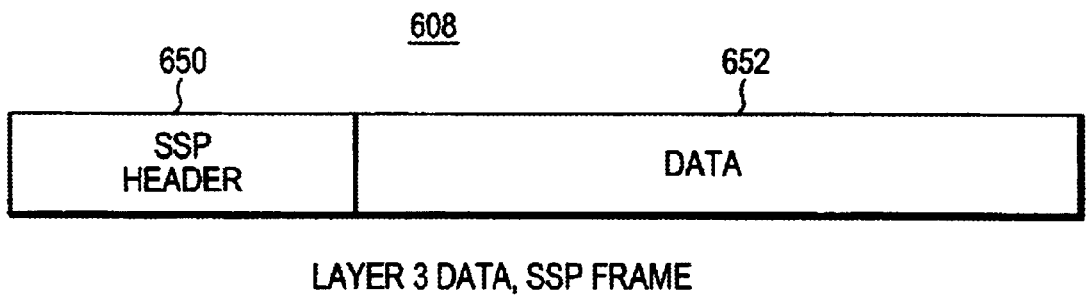
FIG. 6C is a block diagram of a DLSw packet encapsulated with an SSP header.
Figure 6B:
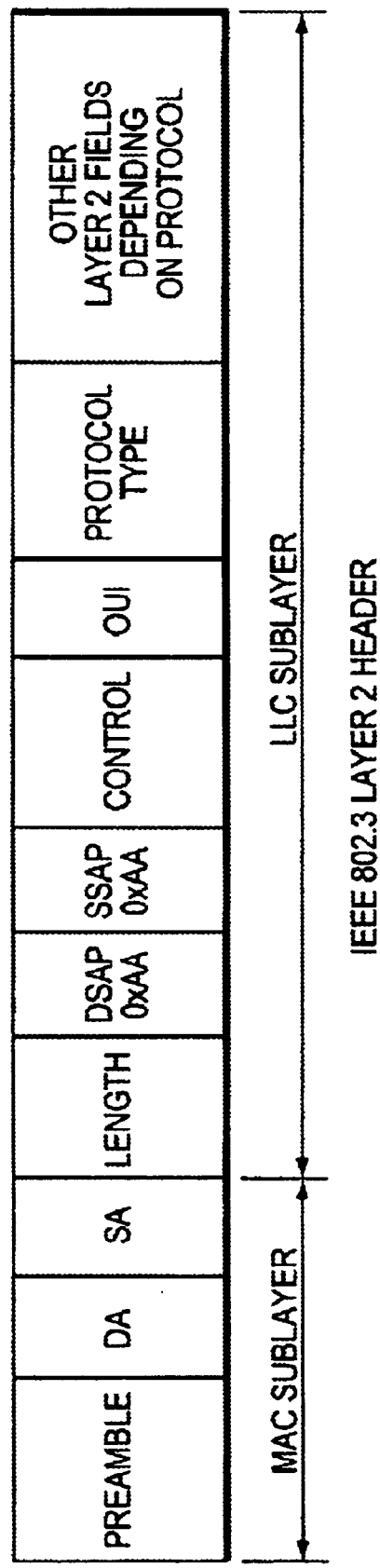
FIG. 6B is a block diagram of a layer 2 header.

Turning now to FIG. 6B, an IEEE 802.3 layer 2 header is shown as a typical layer 2 header 604, as indicated by the underlined reference numeral 604. Field 634 is the frame preamble, as required by the IEEE 802.3 protocol in use for connection 126. Field 622 is the layer 2 destination address (DA), in the present example, the layer 2 address of router 108. Field 624 is the layer 2 source address (SA), in the present example the layer 2 address of source router 104. Field 625 contains the length of the packet. Field 626 contains a DSAP value. Field 627 contains a SSAP value. Field 628 is a control field. For example, the DSAP and SSAP fields 626, 627 may contain the values (hex) "03 AA AA" to indicate the use of the SNAP SAP (Sub Network Attachment Point, of the Service Access Point protocol) option, as explained by Perlman in her above-mentioned book *Interconnections*, pages 28–33. When the SNAP SAP option is used, then field 629 OUI and field 630 Protocol Type are in header 604. Field 629 OUI contains the Organizationally Unique Identifier (OUI), which is a number representing different manufacturers of network equipment. Field 630 is a Protocol Type field used by the manufacturer identified in OUI field 628 in order to identify a protocol defined by that manufacturer. Field 632, "other layer 2 fields depending upon protocol" contains any other fields required by the protocol used in connection 126. For example, in protocols other than IEEE 802.3 such as Source Routing Bridged (SRB) networks, then some fields shown in header 604 do not occur, and other fields such as the Route Identification Field (RIF) do occur, depending upon the protocol or technology employed (for example, the existence of a RIF field is identified to the receiving computer by a setting of the "broadcast" bit in the layer 2 source address in field 624), as described by Perlman in the above-mentioned book *Interconnections* at pages 99–104.

Turning now to FIG. 6C, data field 608 is shown, as is indicated by the underlined reference numeral 608. Field 650 is the SSP header, as defined by RFC 1795. Field 652 contains the data to be transferred from the source end station 122 to the destination end station 134.

Figure 7:
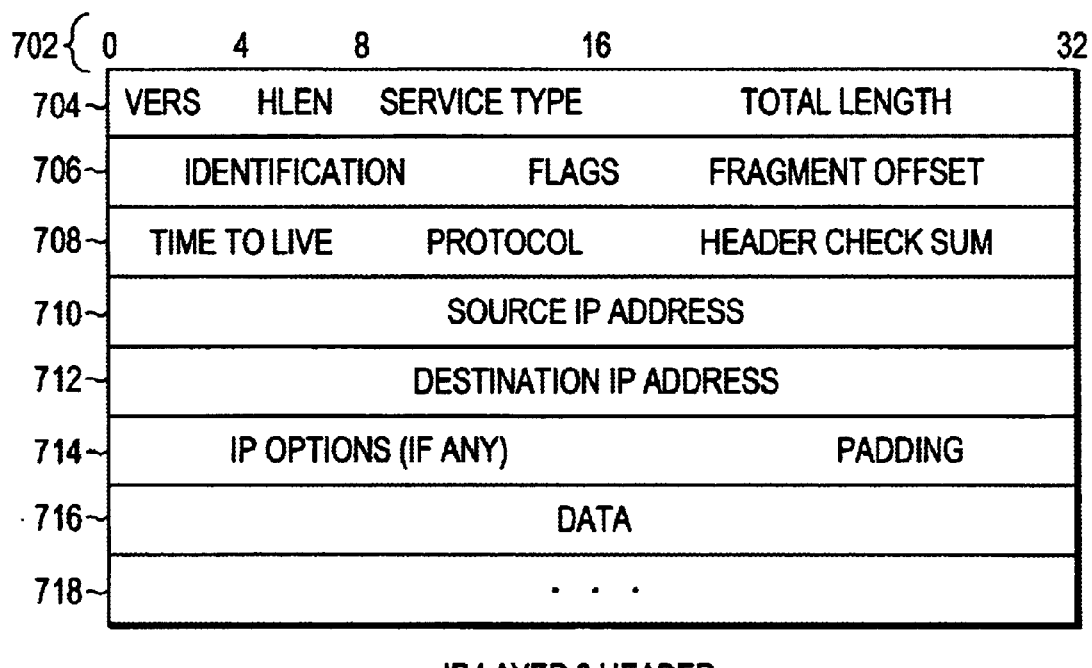
FIG. 7 is a block diagram of a layer 3 IP header.

Turning now to FIG. 7, the various fields of a layer 3 IP header 606 are shown. FIG. 7 follows the format of IP version 4 as explained by Douglas E. Comer in his above mentioned book *Internetworking with TCP/IP, Vol.* 1, at pages 91–97. The numbers "0–32" in row 702 give the bit positions in 32 bit wide fields. Row 704 contains the fields VERS the version number, HLEN a length, SERVICE TYPE a parameter recognized by DLSw switching, and TOTAL LENGTH the length of the encapsulated packet. Row 706 contains fields IDENTIFICATION, FLAGS, and FRAGMENT OFFSET, fields helpful in re-assembling packets into proper order. Row 708 contains fields TIME TO LIVE which gives a maximum hop count for the packet to be forwarded, PROTOCOL and HEADER CHECK SUM, also fields useful for IP, Internet protocol, routing. Row 710 contains the layer 3, or IP, address of the source router 104. Row 712 contains the layer 3, or IP, address of the destination router 108. The destination IP address for the destination router 108 in field 712 is used by intermediate routers (not shown) in network cloud 102 to accomplish connectionless, but connection-oriented such as TCP/IP, routing from source router 104 to destination router 108. Row 714 contains options, if any. Row 716 and subsequent rows 718, etc. contain the data shown in field 608 of FIG. 6A, the layer 3 data, and as also shown in FIG. 6C. As a further example, IP version 6 (Ipv6) was introduced as an updated version of the IP standard, and is thoroughly described by William Stallings in his book *High Speed Networks, TCP/IP and ATM Design Principles,* published by Prentice Hall, Copyright 1998, all disclosures of which are incorporated herein by reference, particularly at pages 27–28, and pages 301–317. Ipv6 is also described by Ulyess Black in his book *TCP/IP and Related Protocols,* published by McGraw Hill, Copyright 1998, all disclosures of which are incorporated herein by reference, especially at pages 144–151.

Figure 8:
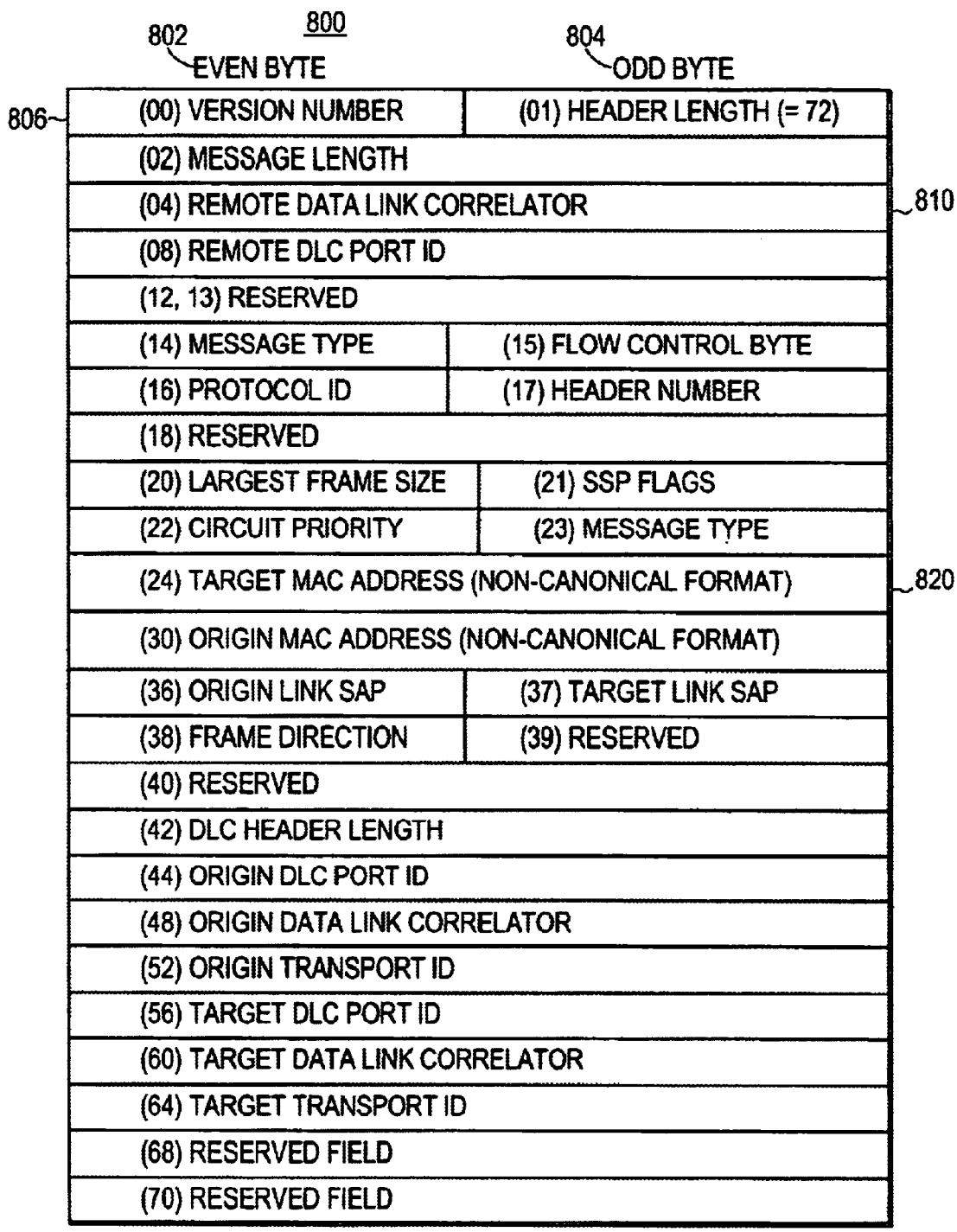
FIG. 8 is a block diagram of a SSP control message header.

Turning now to FIG. 8, fields of a SSP Control Message 800 are shown. The DLSw connection is established by use of a control message 800 of 72 bytes length as set out in RFC 1795. FIG. 8 is in a two byte wide format, with the even byte 802 on the left and the odd byte 804 on the right. Byte offsets for each field are shown in parenthesis at the left of the field. Field 806 (byte offset 00) gives the version number of the DLSw software. Field 807 (byte offset 01) gives the length of the header, 72 bytes. The remote data length correlator is given in field 810, and is established when the DLSw session is established, and is used to guide subsequent packets through the routing and DLSw switching process. Field 816 (offset 14) carries the message type, and is used to specify the message type as set out in Section 3.5 of RFC 1795. The message types of greatest interest in the present discussion are CANUREACH_ex, ICANREACH_ex, NETBIOS_NQ_ex, NETBIOS_NR_ex, etc. Field 820 (offset 24) carries the MAC address of the target end station.

The MAC address of the target end station carried in field 820 is used by the invention in searching, first the local reachability cache, and if no entry is found, searching the Reachability Server. By use of the Reachability Server, information discovered by all of the peer DLSw routers is pooled in one searchable data base. Pooling of reachability information in one data base, which is then searched by a source router greatly reduces the number of search messages carried by the network, thereby saving bandwidth from control message traffic and making the saved bandwidth available for data traffic.

Once a connection is set up using the Control Message of FIG. 8, then individual data messages are transferred by DLSw switching from a source DLSw router to a destination DLSw router using the message header defined in RFC 1795, and as shown in FIG. 9. The DLSw message header of FIG. 9 is the header written into filed 650 of FIG. 6C. The Remote Data Link Correlator field 810 (offset 04) is established when the DLSw session is established, and the same value is written into the corresponding field of the data message header in field 910 (also at offset 04) of FIG. 9. DLSw messages carrying the Data Link Correlator value in field 910 are routed and switched (in response to the value found by the source router in field 910) in the session established by the control messages using the protocol of RFC 1795. Fields of the DLSw Control Message of FIG. 8 and the DLSw Data Message shown in FIG. 9 which are not discussed herein are fully explained in RFC 1795, as those skilled in the art understand.

For a NetBios packet the receiving router must look into data field 652 at a specific offset, as defined in the Net Bios specification, to find the NetBios name. The NetBios name would then be used as a key in the database lookup.

Server Message Protocol

In a preferred embodiment of the invention, the protocol for transfer of messages between a typical router such as router 104 and the reachability server 112A is through the Lightweight Directory Access Protocol (LDAP) as defined in RFC 1777, where RFC stands for "Request For Comments" published by the Internet Engineering Task Force (IETF) in March 1995, and available at the IETF website at the URL www.ietf.org. All disclosures of RFC 1777 are incorporated herein by reference.

The LDAP protocol was developed as a method of accessing a Directory referred to as the X.500 Directory. The X.500 Directory is defined in international standards, as described by Timothy Howes, et al, in their book *LDAP Programming Directory Enabled Applications with Lightweight Directory Access Protocol,* published by Macmillan Technical Publishing Co., Copyright 1997, all disclosures of which are incorporated herein by reference, particularly pages 21–34.

Representative features defined by the LDAP protocol for interacting with the reachability database (the "directory" in the notation of LDAP RFC 1777) maintained by the server comprise, for example, the following. The LDAP protocol provides simple management and browser access to the X.500 Directory including read and write interactive access. The access carries less overhead than using the Directory Access Protocol defined with the X.500 Directory definition. The protocol elements are carried over a simple transport, for example TCP/IP, or for further example Connection Oriented Transport Service (COTS). Many of the protocol elements are carried as simple strings, for example carried as ASCII characters. The general model of LDAP is one of clients, for example router 104, performing protocol operations against servers, for example reachability server 112A.

A client transmits a protocol request describing the operation to be performed to a server. The server is then responsible for performing the necessary operations on the directory. Upon completion of the necessary operations, the server returns a response containing any results or errors to the requesting client. No synchronous behavior on the part of clients or servers is required, as requests and responses for multiple operations may be exchanged by client and servers in any order. The requirement is that clients eventually receive a response for every request that requires one.

All protocol exchanges between client and server are encapsulated in a common envelope, the LDAP message. The LDAP message is defined as:

LDAPMessage::=SEQUENCE {Message ID, protocolOp {CHOICE }}

The choice of protocol operation (protocolOp) comprises:
bindRequest
bindResponse
unbindRequest
searchRequest
searchResponse
modifyRequest
modifyResponse
addRequest
addResponse
delRequest
delResponse
modifyRDNRequest
modifyRDNResponse
compareDNRequest
compareDNResponse
abandonRequest The message ID (messageID) is a unique identifier comprising a string of integers. The message ID uniquely identifies the protocol exchange and is included in a common field in the protocol exchanges, thereby permitting the client to keep requests and responses properly identified. The message ID is particularly necessary when a client has multiple requests outstanding at a given time.

The LDAPResult construct is used to return success or failure indications from servers to clients. Text strings and octet values are associated for the purpose of message exchange. The LDAPResult construct has the syntax:

```
LDAPResult :: =
    SEQUENCE {
        resultCode ENUMERATED {
success                     (0),
operationsError             (1),
protocolError               (2),
timeLimitExceeded           (3),
sizeLimitExceeded           (4),
compareFalse                (5),
compareTrue                 (6),
authMethodNotSupported      (7),
strongAuthRequired          (8),
noSuchAttribute             (16),
undefinedAttributeType      (17),
inappropriateMatching       (18),
constraintViolation         (19),
attributeOrValueExists      (20),
invalidAttributeSyntax      (21),
noSuchObject                (32),
aliasProblem                (33),
```

-continued

```
invalidSyntax              (34),
isLeaf                     (35),
aliasDeferenceingProblem   (36),
inappropriateAuthentication (48),
invalidCredentials         (49),
insufficientAccessRights   (50),
busy                       (51),
unavailable                (52),
unwillingToPerform         (53),
loopDetect                 (54),
namingViolation            (64),
objectClassViolation       (65),
notAllowedOnNonLeaf        (66),
notAllowedOnRDN            (67),
entryAlreadyExists         (68),
objectClassModesProhibited (69),
other                      (80)
        }
matchedDN  LDAPDN
errorMessage  LDAPString }
```

In response to various requests, servers return responses containing fields of type LDAP Result to indicate the final status of a protocol operation request. The error Message field of this construct may, at the servers option, be used to return an ASCII string containing a textual, human-readable error diagnostic. The matchedDN field is used to carry information when the response is no Such Object, alias Problem, invalid DN Syntax, is Leaf, aliasDerefenceProblem, etc.

The Bind Operation initiates a protocol session between a client and a server, and allow authentication of the client to the server. The Bind Operation is the first operation request received by a server from a client in a protocol session.

The Bind Operation requires a response. A Bind Response comprises an indication from the server of the status of the client's request for the initiation of a protocol session.

An Unbind Operation terminates a protocol session.

A Search Operation allows a client to request that a search be performed on its behalf by the server. The search request is defined as follows:

```
SearchRequest :: =
    SEQUENCE {
    baseObject    LDAPN,
    scope         enumerated {
                             baseObject      (0),
                             singleLevel     (1),
                             wholeSubtree    (2)
                  }
    derefAliases  ENUMERATED {
                             neverDerefAliases     (0),
                             derefInSearching      (1),
                             derefFindingBaseObj   (2),
                             derefAlways           (3)
                  },
    sizeLimit     INTEGER    (0 ... maxInt),
    timeLimit     INTEGER    (0 ... maxInt),
    attrsOnly     BOOLEAN,
    filter        Filter,
    attributes    SEQUENCE OF Attribute Type
    }
```

The filter fields are defined as follows:

```
Filter :: =
    CHOICE {
            and              [0] SET OF Filter,
            or               [1] SET OF Filter,
            not              [2] Filter,
            equalityMatch    [3] AttributeValueAssertion,
            substrings       [4] SubstringFilter,
            greaterOrEqual   [5] AttributeValueAssertion,
            lessOrEqual      [6] AttributeValueAssertion,
            present          [7] AttributeType,
            approxMatch      [8] AttributeValueAssertion
        }
```

The substring sequence attribute is defined as follows:

```
SubstringFilter
    SEQUENCE {
        Type    AttributeType,
        SEQUENCE OF CHOICE {
            INITIAL    [0] LDAPString,
            any        [1] LDAPString,
            final      [2] LDAPString
                }
        }
```

Parameters of the search request are as follows.

"base object": An LDAPN that is the base object entry relative to which the search is to be performed.

"scope": An indicator of the scope of the search to be performed. The semantics of the possible values of this field are identical to the semantics of the scope field in the Directory Search Operation as defined in the X.500 protocol.

"derefAliases": An indicator as to how alias objects should be handled in searching. The semantics of the possible values of this field are, in order of increasing value: neverDerefAliases: do not de-reference aliases in searching or in locating the base object of the search.

derefInSeaching: dereference aliases in subordinates of the base object in searching, but not in locating the base object of the search.

derefFindingBaseObject: dereference aliases in locating the base object of the search, but not when searching subordinates of the base object.

derefAlways: dereference aliases both in searching and in locating the base object of the search.

"sizelimit": A sizelimit that restricts the maximum number of entries to be returned as a result of the search. A value of "0" in this field indicates that no sizelimit restrictions are in effect for the search.

"timelimit": A timelimit that restricts the maximum time (in seconds) allowed for a search. A value of "0" in this field indicates that no timelimit restrictions are in effect for the search.

"attrsOnly": An indicator as to whether search results should contain both attribute types and values, or just attribute types. Setting this field to TRUE causes only attribute types (no values) to be returned. Setting this field to FALSE causes both attribute types and values to be returned.

"filter": A filter that defines the conditions that must be fulfilled in order for the search to match a given entry.

"attributes": A list of the attributes from each entry found as a result of the search to be returned. An empty list signifies that all attributes from each entry found in the search are to be returned.

The results of the search attempted by the server upon receipt of a Search Request are returned in Search Response. A Search Response is defined as follows:

```
Search Response :: =
    CHOICE {
        entry SEQUENCE {
            objectName   LDAPDN,
            attributes   SEQUENCE OF SEQUENCE {
                AttributeType,
                SET OF Attribute Value
            }
        },
resultCode   LDAPResult
}
```

The server returns to the client a sequence of responses comprised of:

Zero or more Search Responses each consisting of an entry found during the search.

A single Search Response containing an indication of success, or detailing any errors that have occurred.

Each entry returned contains all attributes, complete with associated values if necessary, as specified in the "attributes" field of the Search Request. The LDAP protocol as described by RFC 1777 can emulate an X.500 "list" operation by a one-level LDAP search operation with a filter checking for the existence of the objectClass attribute, and that an X.500 "read" operation can be emulated by a base object LDAP search operation with the same filter.

The Modify Operation allows a client to request that a modification of the X.500 directory be performed on its behalf by a server. The Modify Request is defined as follows:

```
ModifyRequest :: =
    SEQUENCE {
        object LDAPN,
        modification SEQUENCE OF SEQUENCE {
            operation    ENUMERATED {
                add (0),
                delete (1),
                replace(2)
            },
            modification SEQUENCE {
                type AttributeType,
                values SET OF
                AttributeValue
            }
        }
    }
```

Parameters of the Modify Request are:

"object": The object to be modified. The value of this field should name the object to be modified after all aliases have been dereferenced. The server will not perform any aliases dereferencing in determining the object to be modified.

A list of modifications to be performed on the entry to be modified. The entire list of entry modifications should be performed in the order they are listed, as a single atomic operation. While individual modifications may violate the Directory schema, the resulting entry after the entire list of modifications is performed must conform to the requirements of the Directory schema. The values that may be taken on by the "operation" field in each modification construct have the following semantics respectively:

"add": Add values listed to the given attribute, creating the attribute if necessary.

"delete": Delete values listed from the given attribute, removing the entire attribute if no values are listed, or if all current values of the attribute are listed for deletion.

"replace": Replace existing values of the given attribute with the new values listed, creating the attribute if necessary.

The result of the modify attempted by the server upon receipt of a Modify Request is returned in a Modify Response. The Modify Response is defined as follows.

```
ModifyResponse::=LDAPResult
```

Upon receipt of the Modify Request, a server performs the necessary modifications to the directory.

The server returns to the client a single Modify Response indicating either the successful completion of the directory modification, or the reason that the modification failed.

The Add Operation allows a client to request the addition of an entry into the directory. The Add Request is defined as follows.

```
AddRequest :: =
    SEQUENCE {
        entry    LDAPN,
        attrs    SEQUENCE OF SEQUENCES {
            type     AttributeType,
            values   SET OF AttributeValue
        }
    }
```

Parameters of the Add Request are as follows.

"entry": The Distinguished Name of the entry to be added.

"attrs": The list of attributes that make up the content of the entry being added.

The result of the add attempted by the server upon receipt of a Add Request is returned in the Add Response to the requesting client. The Add Response is defined as follows.

```
AddResponse::=LDAPResult
```

Upon receipt of an Add Request, a server attempts to perform the add requested. The result of the add attempt is returned to the client in the Add Response.

Additional protocol elements defined in RFC 1777 include the Delete Request, the Delete Operation Response, the Modify RDN Request, the Modify RDN Response Operation, Compare Request, Compare Operation Response, the Abandon Operation, etc.

Additional descriptions of the LDAP protocol are given in the book by Timothy Howes, et. al. *Understanding and Deploying LDAP Directory Services*, published by Macmillan Publishing Co., Copyright 1999, all disclosures of which are incorporated herein by reference, and also in the above mentioned other book by Timothy Howes, et al., *LDAP Programming Directory Enabled Applications with Lightweight Directory Access Protocol.*

X.500 Directory

Figure 10:
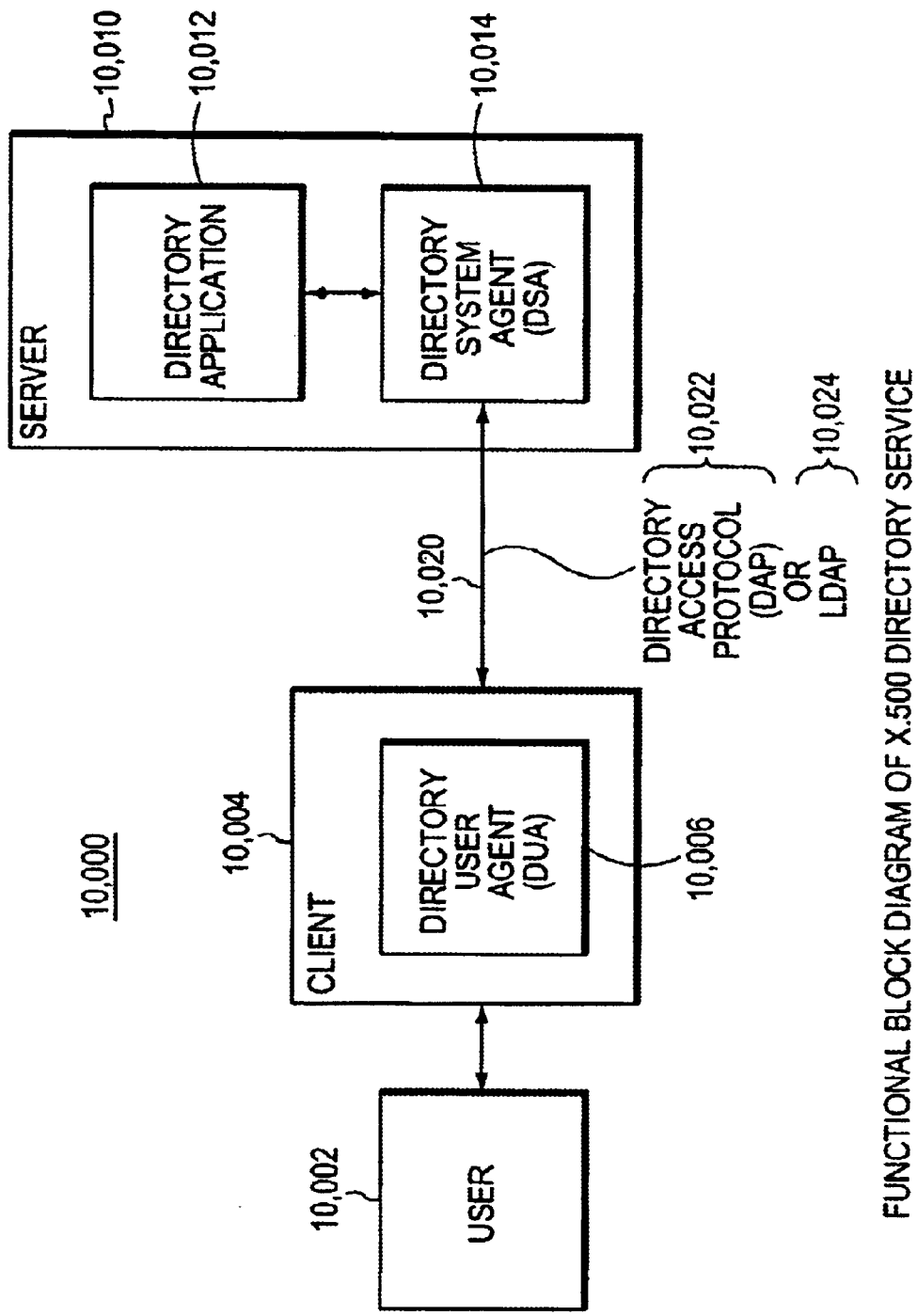
FIG. 10 is a block diagram of a functional model of an X.500 Directory Service.

The X.500 Directory Service 10,000 is based on the "client-server" principle, as shown in FIG. 10. More details than discussed hereinbelow are available in many publications, for example the book by Douglas Steedman, X.500 *The Directory Standard and its Application*, published by Technology Appraisals Ltd, Copyright 1993, all disclosures of which are incorporated herein by reference.

The user 10,002 has an "assistant" as a computer code executing in the user's client computer 10,004. The user's assistant is the "directory user agent" (DUA) 10,006. The DUA 10,006 is an application software component in client computer 10,004 to facilitate user access to the Directory Service. The Directory Service is provided by the DUA 10,006, and server 10,010 on which execute the Directory Application 10,012 and the directory system agent DSA 10,014. Generally, the DSA 10,014 resides on a background computer such as server 10,010 of which users need no knowledge. Communication 10,020 between DUA 10,006 and DSA 10,014 takes place via the standardized Directory Access Protocol (DAP) 10,022, or the simplified variant the Lightweight Directory Access Protocol 10,024 (LDAP as described hereinabove). LDAP 10,024 can be used for clients in networks based on the TCP/IP protocol. LDAP is based on a client-server model in which a client makes a connection over TCP or other transport layer to an LDAP server and sends requests and receives responses for directory information.

A directory is a special purpose database containing directory information. LDAP provides an easy way to retrieve as well as manage data stored in directories. The LDAP protocol is defined in RFC 1777, known as LDAP v2. An informational RFC (RFC-1832) defines the LDAP Application Programmer Interface (API).

An application, that is user 10,002, generally uses the LDAP in four steps:

1. Open a connection 10,020 to an LDAP server, for example server 10,010.
2. Authenticate to the LDAP server and/or to the X.500 DSA 10,014.
3. Perform some LDAP operations and obtain some results.
4. Close the connection 10,020.

In DLSw the X.500 directory service is used for storing the reachability information of devices which are not reachable locally (that is, are not stored in the local reachability cache). In some designs of routers, including those offering DLSw switching, there is no limit set on the number of entries in the local reachability cache. In the event that the reachability cache grows large, the cache may hog too much memory of the router. The use of the directory service allows the reachability directory to grow to a large number of entries, without compromising the memory of any one particular router. Whenever a DLSw router learns the route (reachability router) to a new device (for example, end station) then the DLSw router updates the reachability directory in the X.500 directory service. The protocol of each peer DLSw router is to first check its local cache, if a desired device is not listed therein, the DLSw router transmits an inquiry to the X.500 directory service, for example using the LDAP protocol. In the event that the desired device is listed in the X.500 directory service, then the DLSw router receives the necessary information in a response from the X.500 directory service. In the event that the desired device is not listed in the X.500 directory service, then the directory service initiates a broadcast protocol in an attempt to locate the desired device. In the event that the X.500 directory service is successful in locating the desired device, then the necessary route information is forwarded to the DLSw router.

Other Database Protocols

As a further example of database implementation of the reachability server 112A, any convenient standard database system may be used. For example, a database using an Oracle Systems commercial database, a Microsoft Access commercial database, etc. could be used. The protocol for message passing between a router such as, for example, router 104 and the database of the reachability server 112A would then employ the protocols specified by the database manufacturer, for example Standard Query Language (SQL), etc.

Generalized Network

Figure 11:
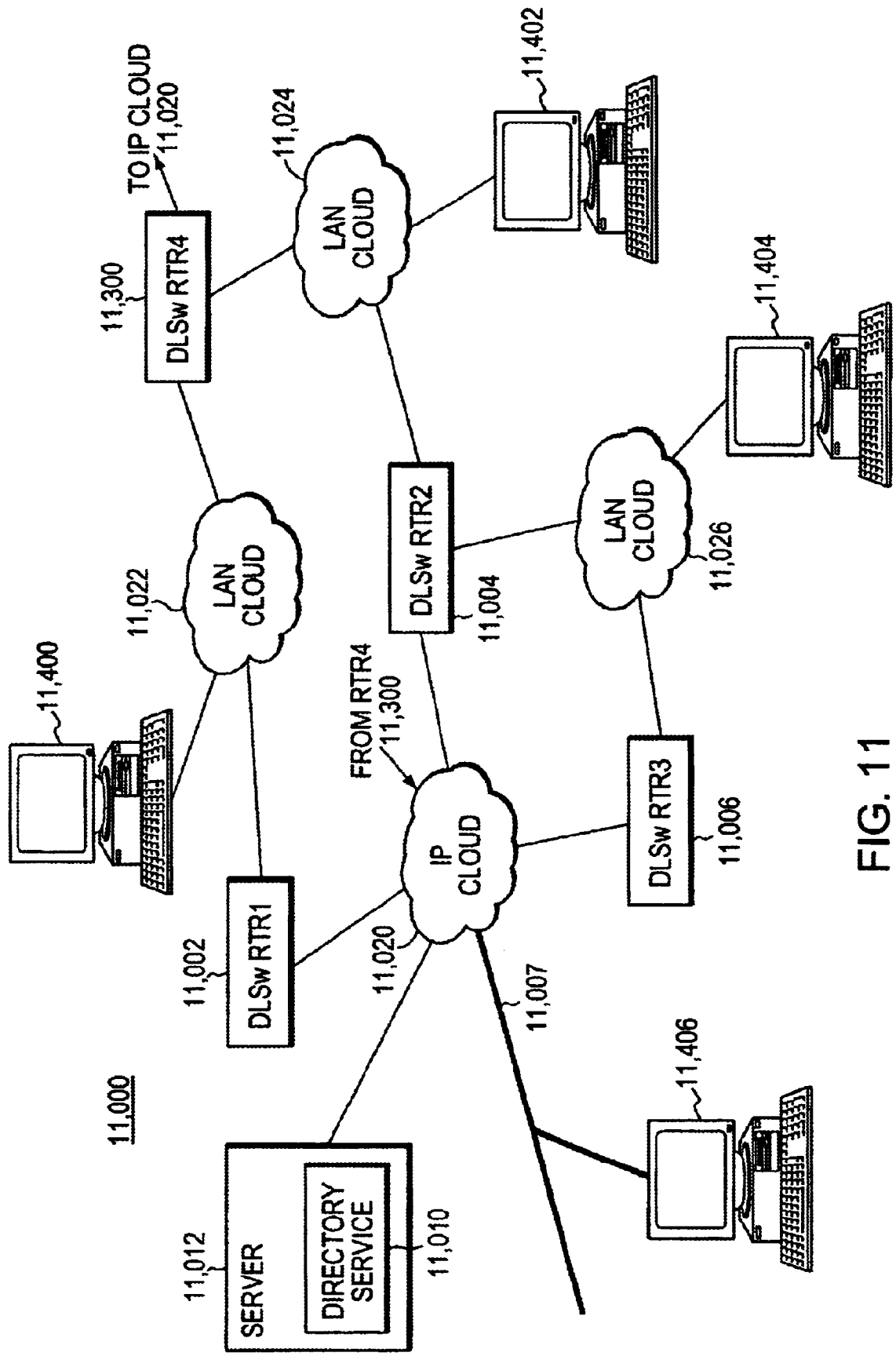
FIG. 11 is a block diagram of a generalized network using the invention.

Turning now to FIG. 11 there is shown a generalized network 11,000 of DLSw routers (router RTR1 11,002, RTR2 11,004, RTR3 11,006, RTR4 11,300 etc.) making use of a Reachability Directory Service 11,010 running as a server 11,012. The DLSw routers 11,002, 11,004, 11,006, 11,300 etc. communicate through IP network cloud 11,020. Server 11,012 is implemented in software running on any convenient computer which can be reached through IP network cloud 11,020.

Each DLSw router communicates with one or more Local Area Network Clouds (LAN Clouds). For example: DLSw router RTR1 11,002 connects to LAN cloud 11,022; DLSw router RTR2 11,004 connects to LAN cloud 11,022, LAN cloud 11,024 and LAN cloud 11,026; DLSw router RTR3 11,006 connects to LAN cloud LAN 11,026; DLSw router RTR4 11,300 connects to LAN cloud 11,022 and LAN cloud 11,024; etc.

The LAN clouds can be any technology, for example IEEE 802.5 token rings, Ethernet LANs such as IEEE 802.3 standard Ethernets, FDDI token rings, Asynchronous Transfer Mode (ATM) networks implementing LAN Emulation (LANE), etc. DLSw routers RTR1 11,002, RTR2 11,004, RTR3 11,006, RTR4 11,300 etc. are "peer DLSw routers" communicating by TCP/IP through IP cloud 11,020. A network may, for example, have only a few peer-to-peer DLSw routers, or for example, the network may have several hundred, or several thousand peer-to-peer DLSw routers communicating through IP cloud 11,020.

In any case, a source DLSw router (not specifically identified in FIG. 11) receives a packet from a LAN, where the packet is addressed to a desired destination address. The desired destination address may be identified by, for example a layer 2 address (that is a MAC address) of an end station, etc. The end station is a computer having the desired destination address, and is expected to be connected to one of the LANs which is reachable through a peer DLSw router. The source DLSw router looks up the destination address in its reachability cache, and in the event that it does not find the destination address listed therein, the receiving DLSw router contacts Reachability Directory Service 11,010. In the event that Reachability Directory Service 11,010 has an entry for the desired destination address, then Reachability Directory Service 11,010 returns the address of a DLSw router (reachability router) which can reach the destination address. The source DLSw router then both sends a DLSw encapsulated packet to the identified reachability DLSw router, and updates its internal reachability cache.

In the event that the desired destination address is not listed in an entry in the Reachability Directory Service 11,010, then a "can you reach" protocol is initiated by the source router by it transmitting a CANUREACH message onto IP cloud 11,020. The CANUREACH message is transmitted by the source router in order for it to learn if any DLSw router connected to IP cloud 11,020 can reach the desired destination address. Each DLSw router receiving the CANUREACH message must then check its routing tables, and if the desired destination end station is not listed, then initiate a search for the destination address by an appropriate protocol such as, SNA TEST FRAME, NetBios NAME QUERY, etc., depending upon the technology of the LANs attached to ports of the DLSw router. Once the address of a DLSw router which can reach the desired destination address is located, then that router returns an ICANREACH message to the source router. Each DLSw router which can transmit to the desired destination end station returns an ICANREACH message to the source router. The source router then updates its internal reachability cache and also transmits an update message to Reachability Directory Service 11,010.

Any end station will have one or more entries in Reachability Directory Service 11,010, depending upon how many DLSw routers determine that they can reach the end station. For example, end station 11,400 will have three entries, one naming DLSw router RTR1 11,002 one naming DLSw router RTR2 11,004, and the other naming DLSw router RTR4 11,300, as both of these routers can reach end station 11,400 through LAN cloud 11,022. Also, end station 11,402 will have two entries in Reachability Directory Service 11,010, one listing DLSw router RTR4 11,300 and the other listing DLSw router RTR2 11,004, as both routers can reach end station 11,402 through LAN cloud 11,024. Similarly, end station 11,404 will have two entries in Reachability Directory Service 11,010, one listing DLSw router RTR3 11,006, and the other listing DLSw router RTR2 11,004, as both routers can reach end station 11,404 through LAN cloud 11,026. In contrast, end station 11,406 will have only one entry in Reachability Directory Service 11,010 as it can be reached only by LAN 11,007 through DLSw router RTR3 11,006

The various reachability routers are indexed by the destination address of the end station in the multiple entries as shown in the Reachability Table of FIG. 4, as that Table is implemented in Reachability Directory Service 11,010. As noted in FIG. 4, an end station which can be reached by more than one DLSw router will have an entry for each of the DLSw routers, and the entries will all be indexed by the layer 2 address of the end station, as shown in FIG. 4.

Figure 12:
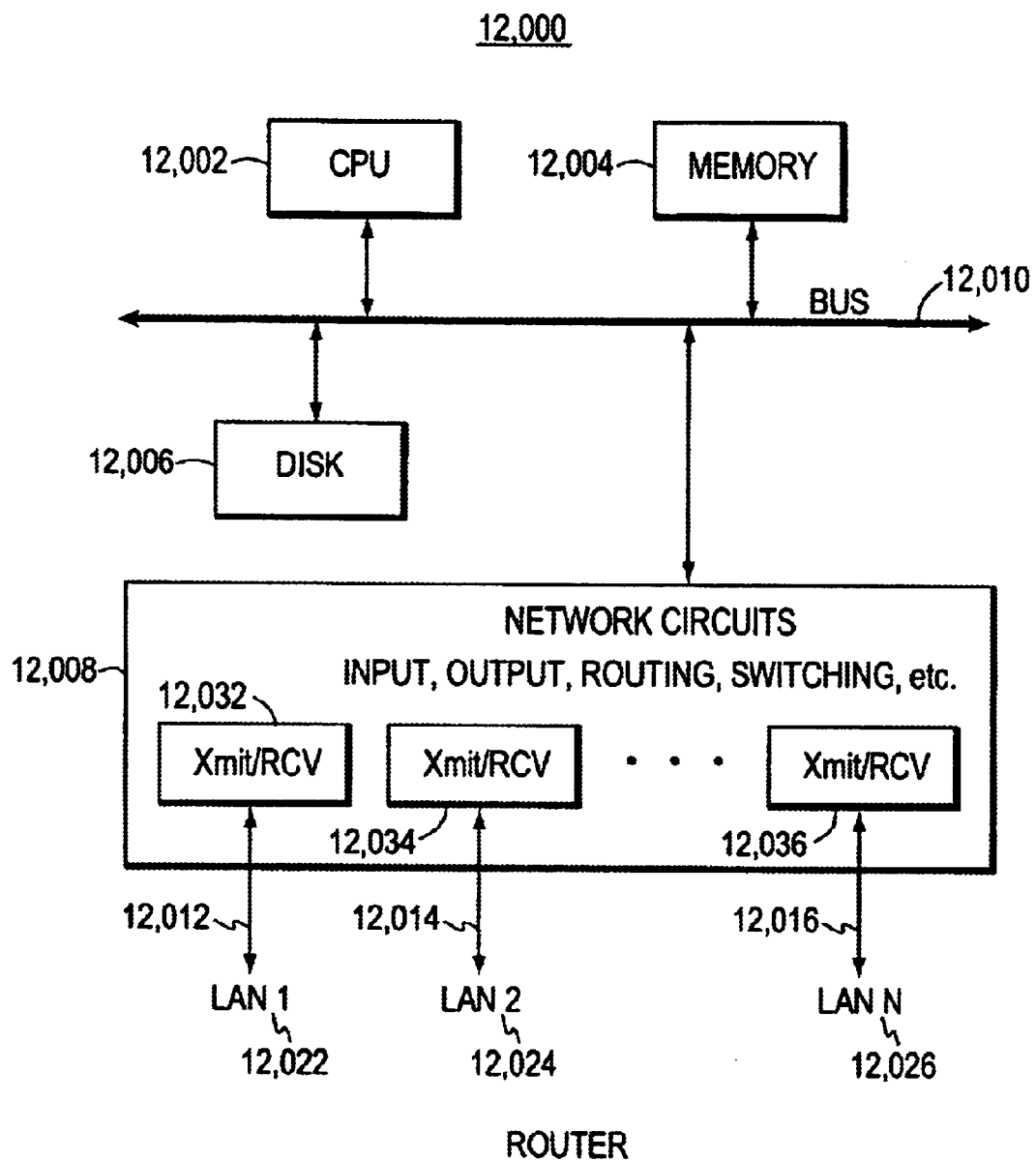
FIG. 12 is a block diagram of a router.

Turning now to FIG. 12, a block diagram of a typical router 12,000 is shown. Central processor unit (CPU) 12,002 manages operation of the router. Memory 12,004 holds data structures, data, and instructions useful to operation of router 12,000. Memory 12,004 may be any type of electronic memory, Random Access Memory (RAM), Read Only Memory (ROM), etc. Disk 12,006 is an internal disk drive to facilitate operation of router 12,000. Disk 12,006 is optional, and many designs of routers do not use an internal disk drive 12,006. Network circuit 12,008 contains the major routing circuits of router 12,000. Bus 12,010 connects the CPU 12,002, Memory 12,004, Disk (if any) 12,006, and network circuits 12,008 together so that they can exchange information by use of typical bus protocols.

Network circuit 12,008 contains the circuits responsible for input from local area networks (LANs) output to LANs, circuits for routing of data packets, and circuits for performing switching. Particularly, switching of packets using only Layer 2 constructs, as discussed with reference to FIG. 5, is accomplished by network circuit 12,008. Each port 12,012, 12,014, 12,016 of router 12,000 connects to a different local area network (LAN). For example, port 12,012 connects t a LAN designated as LAN1 12,022. Port 12,014 connects to LAN2 12,024. There may be a large number of ports, and the highest numbered port is represented as port N 12,016, where LAN N 12,026 is shown connected to port N 12,016. The three dots 12,030 indicate that network circuits 12,008 may serve many router ports. Each port is connected to its transmitter and receiver.

Transmitter and receiver circuit Xmit/RCV 12,032 serves port 12,012 and LAN 1 12,022. Xmit/RCV circuit 12,034 serves port 12,014 and LAN 2 12,024. There is a transmit and receive circuit for each LAN, and so correspondingly Xmit/RCV circuit 12,036 serves port N 12,016 and LAN N 12,026.

The layers of the communications models as shown in FIG. 5, and discussed with reference thereto, are implemented in various convenient hardware elements as shown in the block diagram of a router of FIG. 12. For example, depending upon the design of the router, Layer 1 510 and Layer 2 512 may be implemented in hardware in the circuits of network circuits 12,008. Alternatively, field parsing and recognition functions may be implemented in software which executes on CPU 12,002 in connection with memory 12,004. Higher layer functions such as Layer 3 network 516 or internet 518 may be implemented in software executing on CPU 12,002. Layer 4 reliable transport implemented in the transport layer 520 or transport layer 522 is usually implemented in software executing in CPU 12,002, although even Layer 4 functions may be implemented in hardware by using an ASIC semiconductor chip.

The reachability database as shown in FIG. 4, and the Reachability Server 112A, may be stored in memory 12,004 of a router 12,000. Alternatively, the Reachability Server 112A may be implemented in a computer which is not a router, and which therefore does not have network circuits 12,008, but has a CPU and Memory similar to those shown in router 12,000, but has a simple connection to the computer network such as one port. The reachability database is then implemented in the memory of the computer.

It is to be understood that the above-described embodiments are simply illustrative of the principles of the invention. Various other modifications and changes may be made by those skilled in the art which embody the principles of the invention and fall within the spirit and scope thereof.

What is claimed is:

1. A method of routing a data packet addressed to a destination address, comprising:

receiving said data packet by a source router;

determining, by said source router, that said data packet is to be encapsulated as an encapsulated packet, and said encapsulated packet routed by a peer-to-peer protocol to a destination router;

maintaining a database on a server, said database having entries for destination addresses, an entry for a particular destination addresses giving the address of a router capable of routing a packet to said particular destination addresses;

interrogating said database on said server by said source router to learn the address of a destination router, said destination router capable of routing a packet to said destination addresses;

addressing, in response to information received from said database connecting said destination address with said destination router, said encapsulated packet to said destination router;

transmitting said encapsulated packet onto a connectionless network for transmission to said destination router;

searching by said source router, in response to information received from said database that said destination address is not found, for a destination router capable of reaching said destination address;

receiving by said source router information connecting said destination address with a name of a destination router capable of reaching said destination address; and transmitting said encapsulated packet onto a connectionless network for transmission to said destination router.

2. The method as in claim 1 further comprising:
maintaining said database in a directory service running on a convenient computer.

3. The method as in claim 1 further comprising:
interrogating said database with a lightweight data access protocol (LDAP).

4. The method as in claim 1 further comprising:
determining that said peer-to-peer routing protocol is DLSw protocol.

5. The method as in claim 1 further comprising:
encapsulating said data with an SSP header.

6. The method as in claim 1 wherein said transmitting step further comprises:
transmitting said encapsulated packet according a connection-oriented protocol.

7. The method as in claim 6 further comprising:
transmitting said encapsulated packet according to a TCP/IP connection-oriented protocol.

8. The method as in claim 1 further comprising:
receiving said encapsulated packet by said destination router;
transmitting by said destination router, in response to receiving said encapsulated packet, a destination packet onto a computer network having said destination address connected thereto, said destination packet addressed to said destination address.

9. The method as in claim 1 wherein said maintaining said database further comprising: maintaining said database in accordance with an X.500 standard.

10. The method as in claim 1 further comprising:
updating said database with said information connecting said destination address with a name of a destination router capable of reaching said destination address.

11. The method as in claim 1 wherein said searching step further comprises:
transmitting by said source router a message asking peer routers if they can reach said destination address.

12. The method as in claim 1 further comprising:
saving said destination address in a reachability table as a Layer 2 address of an end station.

13. The method as in claim 1 further comprising:
saving said destination address in a reachability table as an address of a process in a destination end station.

14. The method as in claim 1 further comprising:
saving said destination address in a reachability table as an address of a logical unit in a SNA network.

15. A method of routing a data packet addressed to a destination address, comprising:
receiving said data packet by a source router;
determining, by said source router, that said data packet is to be encapsulated as an encapsulated packet, and said encapsulated packet routed by a peer-to-peer protocol to a destination router;
maintaining a database on a server, said database having entries for destination addresses, an entry for a particular destination addresses giving the address of a router capable of routing a packet to said particular destination addresses;
interrogating said database on said server by said source router to learn the address of a destination router, said destination router capable of routing a packet to said destination addresses;
addressing, in response to information received from said database connecting said destination address with said destination router, said encapsulated packet to said destination router; and,
transmitting said encapsulated packet onto a connectionless network for transmission to said destination router;
searching by said source router, in response to information received from said database that said destination address is not found, for a destination router capable of reaching said destination address;
receiving by said source router information connecting said destination address with a name of a destination router capable of reaching said destination address;
transmitting said encapsulated packet onto a connectionless network for transmission to said destination router; and,
updating said database with said information connecting said destination address with a name of a destination router capable of reaching said destination address.

16. The method as in claim 15 wherein said searching step further comprises:
transmitting by said source router a message asking peer routers if they can reach said destination address.

17. An apparatus to route a data packet addressed to a destination address, comprising:
means for receiving said data packet by a source router;
means for determining, by said source router, that said data packet is to be encapsulated as an encapsulated packet, and said encapsulated packet routed by a peer-to-peer protocol to a destination router;
means for maintaining a database on a server, said database having entries for destination addresses, an entry for a particular destination addresses giving the address of a router capable of routing a packet to said particular destination addresses;
means for interrogating said database on said server by said source router to learn the address of a destination router, said destination router capable of routing a packet to said destination addresses;
means for addressing, in response to information received from said database connecting said destination address with said destination router, said encapsulated packet to said destination router;
means for searching by said source router, in response to information received from said database that said destination address is not found, for a destination router capable of reaching said destination address;
means for receiving by said source router information connecting said destination address with a name of a destination router capable of reaching said destination address; and,
means for transmitting said encapsulated packet onto a connectionless network for transmission to said destination router.

18. An apparatus to route a data packet addressed to a destination address, comprising:
a receiver in a source router to receive said data packet;
a header field examining apparatus in said source router, to determine that said data packet is to be encapsulated as an encapsulated packet, and said encapsulated packet routed by a peer-to-peer protocol to a destination router;
a database on a server, said database having entries for destination addresses, an entry for a particular destination addresses giving the address of a router capable of routing a packet to said particular destination addresses;

a first transmitter and protocol stack to interrogate said database on said server by said source router to learn the address of a destination router, said destination router capable of routing a packet to said destination addresses, said transmitter to send an inquiry message to said database;

a protocol stack to address, in response to information received from said database connecting said destination address with said destination router, said encapsulated packet to said destination router;

a searching apparatus in said source router to search for, in response to information received from said database that said destination address is not found, a destination router capable of reaching said destination address;

a second receiver in said source router to receive information connecting said destination address with a name of a destination router capable of reaching said destination address; and, a second transmitter and protocol stack to transmit said encapsulated packet onto a connectionless network for delivery to said destination router.

19. A method of routing a data packet addressed to a destination address, comprising:

receiving said data packet by a source router;

determining, by said source router, that said data packet is to be encapsulated as an encapsulated packet, and said encapsulated packet routed by a peer-to-peer protocol to a destination router;

interrogating a database, said database maintained on a server, said database having entries for destination addresses, an entry for a particular destination addresses giving the address of a router capable of routing a packet to said particular destination addresses;

addressing, in response to information received from said database connecting said destination address with said destination router, said encapsulated packet to said destination router;

searching by said source router, in response to information received from said database that said destination address is not found, for a destination router capable of reaching said destination address;

receiving by said source router information connecting said destination address with a name of a destination router capable of reaching said destination address; and, transmitting said encapsulated packet onto a connectionless network for transmission to said destination router.

20. A source router to route a data packet addressed to a destination address, comprising:

means for receiving said data packet by said source router;

means for determining, by said source router, that said data packet is to be encapsulated as an encapsulated packet, and said encapsulated packet routed by a peer-to-peer protocol to a destination router;

means for interrogating a database, said database maintained on a server, said database having entries for destination addresses, an entry for a particular destination addresses giving the address of a router capable of routing a packet to said particular destination addresses;

means for addressing, in response to information received from said database connecting said destination address with said destination router, said encapsulated packet to said destination router;

means for searching by said source router, in response to information received from said database that said destination address is not found, for a destination router capable of reaching said destination address;

means for receiving by said source router information connecting said destination address with a name of a destination router capable of reaching said destination address; and, means for transmitting said encapsulated packet onto a connectionless network for transmission to said destination router.

21. A source router to route a data packet addressed to a destination address, comprising:

a receiver to receive said data packet by said source router;

a packet parsing circuit to determine, by said source router, that said data packet is to be encapsulated as an encapsulated packet, and said encapsulated packet routed by a peer-to-peer protocol to a destination router;

a cpu and a transmit circuit, to interrogate a database, said database maintained on a server, said database having entries for destination addresses, an entry for a particular destination addresses giving the address of a router capable of routing a packet to said particular destination addresses;

a network circuit circuit to address, in response to information received from said database connecting said destination address with said destination router, said encapsulated packet to said destination router;

said network circuit to search, in response to information received from said database that said destination address is not found, for a destination router capable of reaching said destination address;

a receiver to receive at said source router information connecting said destination address with a name of a destination router capable of reaching said destination address; and, a transmitting circuit to transmit said encapsulated packet onto a connectionless network for transmission to said destination router.

22. A router, comprising:

means for receiving by said router a data packet addressed to a particular destination address, said router herinafter refered to as a source router;

means for determining by said source router that said data packet is to be encapsulated as an encapsulated packet, and said encapsulated packet routed by a peer-to-peer protocol to a destination router;

means for interrogating a database, said database having entries for destination addresses, an entry for a destination addresses giving the address of a router capable of routing a packet to said destination addresses by said source router to learn the address of a destination router, said destination router capable of routing a packet to said particular destination address;

means for addressing, in response to information received from said database connecting said particular destination address with said destination router, said encapsulated packet to said destination router;

means for searching by said source router, in response to information received from said database that said destination address is not found, for a destination router capable of reaching said destination address;

means for receiving by said source router information connecting said destination address with a name of a destination router capable of reaching said destination address;

means for transmitting said encapsulated packet onto a connectionless network for transmission to said destination router.

23. The router as in claim 22, further comprising:

means for maintaining said database in a directory service running on a server.

24. The router as in claim 22, further comprising:

means for interrogating said database with a lightweight data access protocol (LDAP).

25. The router as in claim 22, further comprising:

means for determining that said peer-to-peer routing protocol is DLSw protocol.

26. The router as in claim 22, further comprising:

means for encapsulating said data with an SSP header.

27. The router as in claim 22, wherein said transmitting step further comprises:

means for transmitting said encapsulated packet according a connection-oriented protocol.

28. The router as in claim 27, further comprising:

means for transmitting said encapsulated packet according to a TCP/IP connection-oriented protocol.

29. A The router as in claim 22, further comprising:

means for receiving said encapsulated packet by said destination router;

means for transmitting by said destination router, in response to receiving said encapsulated packet, a destination packet onto a computer network having said destination address connected thereto, said destination packet addressed to said destination address.

30. The router as in claim 22, wherein said maintaining said database further comprising:

means for maintaining said database in accordance with an X.500 standard.

31. The router as in claim 22, further comprising:

means for updating said database with said information connecting said destination address with a name of a destination router capable of reaching said destination address.

32. The router as in claim 22, wherein said searching step further comprises:

means for transmitting by said source router a message asking peer routers if they can reach said destination address.

33. A router, comprising:

means for receiving by said router a data packet addressed to a destination address, said router hereinafter referred to as a source router;

means for determining, by said source router, that said data packet is to be encapsulated as an encapsulated packet, and said encapsulated packet routed by a peer-to-peer protocol to a destination router;

means for maintaining a database on a server, said database having entries for destination addresses, an entry for a particular destination addresses giving the address of a router capable of routing a packet to said particular destination addresses;

means for interrogating a database by said source router, said database having entries for destination addresses, an entry for a particular destination addresses giving the address of a router capable of routing a packet to said particular destination addresses;

means for addressing, in response to information received from said database connecting said destination address with said destination router, said encapsulated packet to said destination router; and, means for transmitting said encapsulated packet onto a connectionless network for transmission to said destination router;

means for searching by said source router, in response to information received from said database that said destination address is not found, for a destination router capable of reaching said destination address;

means for receiving by said source router information connecting said destination address with a name of a destination router capable of reaching said destination address;

means for transmitting said encapsulated packet onto a connectionless network for transmission to said destination router; and, means for updating said database with said information connecting said destination address with a name of a destination router capable of reaching said destination address.

34. The router as in claim 33 wherein said means for searching further comprises:

means for transmitting by said source router a message asking peer routers if they can reach said destination address.

35. A system to route a data packet addressed to destination address, comprising:

a source router to receive said data packet;

said source router determining that said data packet is to be encapsulated as an encapsulated packet, and said encapsulated packet routed by a peer-to-peer protocol;

a database, said database having entries for destination addresses, an entry for a particular destination addresses giving the address of a router capable of routing a packet to said particular destination addresses;

said source router interrogating said database to learn the address of a destination router, said destination router capable of routing a packet to said destination addresses;

said source router addressing said packet, in response to information received from said database connecting said destination address with said destination router, said encapsulated packet to said destination router;

said source router, in response to information received from said database that said destination address is not found, searching for a destination router capable of reaching said destination address;

said source router information connecting said destination address with a name of a destination router capable of reaching said destination address; and, said source router transmitting said encapsulated packet, using said peer-to-peer protocol, onto a connectionless network to said destination router.

36. The system as in claim 35, further comprising:

said destination router receiving said packet, and said destination router transmitting said packet to said destination address.

37. A method for operating a router, comprising:

receiving a data packet addressed to a particular destination address at said router, said router hereinafter referred to as a source router;

determining that said data packet is to be encapsulated as an encapsulated packet, and said encapsulated packet routed by a peer-to-peer protocol to a destination router;

interrogating a database, said database having entries for destination addresses, an entry for a destination addresses giving the address of a router capable of routing a packet to said destination addresses by said source router to learn the address of a destination router, said destination router capable of routing a packet to said particular destination address;

addressing, in response to information received from said database connecting said particular destination address with said destination router, said encapsulated packet to said destination router;

searching, in response to information received from said database that said destination address is not found, for a destination router capable of reaching said destination address;

receiving information connecting said destination address with a name of a destination router capable of reaching said destination address: and, transmitting said encapsulated packet onto a connectionless network for transmission to said destination router.

38. The method as in claim 37, further comprising:

updating said database with said information connecting said destination address with a name of a destination router capable of reaching said destination address.

39. A computer readable media, comprising:

said computer readable media having instructions written thereon for execution on a processor for the practice of the method of claim 1 or claim 16 or claim 23 or claim 37.

40. Electromagnetic signals propagating on a computer network, comprising:

said electromagnetic signals carrying instructions for execution on a processor for the practice of the method of claim 1 or claim 15 or claim 19 or claim 37.

* * * * *